(12) United States Patent
Devries

(10) Patent No.: US 10,192,258 B2
(45) Date of Patent: Jan. 29, 2019

(54) METHOD AND SYSTEM OF AUGMENTED-REALITY SIMULATIONS

(71) Applicant: Derek A Devries, San Francisco, CA (US)

(72) Inventor: Derek A Devries, San Francisco, CA (US)

( * ) Notice: Subject to any disclaimer, the term of this patent is extended or adjusted under 35 U.S.C. 154(b) by 275 days.

(21) Appl. No.: 15/245,129

(22) Filed: Aug. 23, 2016

(65) Prior Publication Data

US 2018/0060946 A1    Mar. 1, 2018

(51) Int. Cl.
| | |
|---|---|
| *G06Q 30/00* | (2012.01) |
| *G06Q 30/06* | (2012.01) |
| *G06T 19/00* | (2011.01) |
| *G06K 9/00* | (2006.01) |
| *G06F 3/01* | (2006.01) |
| *G06T 19/20* | (2011.01) |
| *G06T 7/00* | (2017.01) |

(52) U.S. Cl.
CPC ......... *G06Q 30/0643* (2013.01); *G06F 3/017* (2013.01); *G06K 9/00671* (2013.01); *G06T 19/006* (2013.01); *G06T 19/20* (2013.01); *G06T 7/0004* (2013.01)

(58) Field of Classification Search
None
See application file for complete search history.

(56) References Cited

U.S. PATENT DOCUMENTS

| | | | |
|---|---|---|---|
| 9,767,613 B1* | 9/2017 | Bedikian | G06T 19/006 |
| 2006/0268007 A1* | 11/2006 | Gopalakrishnan | G06F 17/30244 345/619 |
| 2012/0162254 A1* | 6/2012 | Anderson | H04N 5/2621 345/633 |
| 2012/0249741 A1* | 10/2012 | Maciocci | G06F 3/011 348/46 |
| 2014/0099623 A1* | 4/2014 | Amit | G09B 7/00 434/350 |
| 2015/0070347 A1* | 3/2015 | Hofmann | G06K 9/00208 345/419 |
| 2015/0169076 A1* | 6/2015 | Cohen | G06F 3/04815 345/156 |

* cited by examiner

*Primary Examiner* — Mila Airapetian

(57) ABSTRACT

In one exemplary embodiment, a method includes the step of obtaining a digital image of an object with a digital camera. The object is identified. A user query is received. The method includes the step of matching, with at least one processor, the user query with at least one manipulable portion of a virtual view of the digital image of the object. The method includes the step of obtaining the at least one manipulable portion from a database of manipulable portions of the object. The method includes the step of integrating the at least one manipulable portion with the virtual view of the digital image of the object, wherein a manipulable portion comprises a region of an augmented-reality element integrated into the virtual view of the digital image of the object, and wherein the augmented-reality element comprises a hyper link to another augmented-reality element comprising a virtual interior view of the object and wherein the camera obtains the predefined user gesture.

16 Claims, 16 Drawing Sheets

METHOD AND SYSTEM OF AUGMENTED-REALITY SIMULATIONS

CROSS-REFERENCE TO RELATED APPLICATIONS

This application incorporates by reference U.S. patent application Ser. No. 13/840,120 titled MOBILE DEVICE EVENT CONTROL WITH DIGITAL IMAGES and filed on Mar. 15, 2013. This application is a continuation-in-part of ands incorporates by reference U.S. patent application Ser. No. 14/161,978 titled METHOD AND SYSTEM OF AUGMENTED-REALITY SIMULATIONS and filed on Jan. 23, 2014. This application is hereby incorporated by reference in its entirety.

BACKGROUND OF THE INVENTION

1. Field

This application relates generally to human-computer interfaces, and more specifically to a system, article of manufacture, and method for augmented-reality simulations.

2. Related Art

A user's computing device can include a display. The user can use the display to view an augmented-reality view of the user's environment and/or objects in the user's environment. Augmented-reality technology (e.g. adding computer vision and object recognition) can provide information about the surrounding real world of the user. In an augmented-reality view, artificial information about the environment and its objects can be overlaid on the real world. Augmented-reality views can also be interactive and digitally manipulable. There is therefore a need and an opportunity to improve the methods and systems whereby a user can interact and digitally manipulate augmented-reality simulations of the user's environment.

BRIEF SUMMARY OF THE INVENTION

In one aspect, a method includes the step of obtaining a digital image of an object with a digital camera. The object is identified. A user query is received. The method includes the step of matching, with at least one processor, the user query with at least one manipulable portion of a virtual view of the digital image of the object. The method includes the step of obtaining the at least one manipulable portion from a database of manipulable portions of the object. The method includes the step of integrating the at least one manipulable portion with the virtual view of the digital image of the object, wherein a manipulable portion comprises a region of an augmented-reality element integrated into the virtual view of the digital image of the object, and wherein the augmented-reality element comprises a hyper link to another augmented-reality element comprising a virtual interior view of the object, wherein a user access the other augmented-reality element by performing a predefined user gesture with respect to a location of the object that corresponds to the at least one manipulable portion, and wherein the digital camera obtains the predefined user gesture. The at least one manipulable portion in the virtual view of the digital image of the object and the augmented-reality element is displayed with a computer display.

Optionally, the object can be a building. The manipulable portion of the building can include a wall region of the building. The user gesture can include a pointing motion with a hand of the user. The other augmented reality portion can include a digital image of a view of one or more interior rooms of the building. The digital image can be obtained from a database of digital images comprising interior rooms of the building. The computer display can be an augmented reality goggles display system.

In another aspect, a method of an augmented-reality simulation includes providing, with at least one processor, an augmented-reality view with a display of a computing device, wherein the augmented-reality includes a physical object and at least one augmented-reality element. The method includes obtaining a digital image of a symbolic input drawn by a user, wherein the digital image obtained from digital camera system of the computing device. The method includes obtaining at least one digital image of a first user hand gesture with respect to the symbolic input drawn by the user. The method includes providing a one or more set of manipulable portions of the augmented reality element. The method includes determining which of the one or more set of manipulable portions are relevant to the symbolic input and the first user hand gesture. The method includes automatically identifying the physical object with an image recognition system. The method includes receiving a user query via a user input system of the computer device. The method includes matching, with at least one processor, the user query with at least one manipulable portion of the augmented-reality view. The method includes obtaining the at least one manipulable portion from a database of manipulable portions associated with the physical object. The method includes integrating the at least one manipulable portion with the augmented-reality view, wherein a manipulable portion includes a region of the augmented-reality element integrated into the augmented-reality view, and wherein the augmented-reality element includes a hyper link to another augmented-reality element comprising a virtual interior view of the physical object. The method includes determining that the user performed a predefined user gesture with respect to a location of the physical object that corresponds to the at least one manipulable portion, and wherein the digital camera obtains the predefined user gesture. The method includes displaying, with a computer display, the at least one manipulable portion in the augmented-reality view.

The Figures described above are a representative set, and are not an exhaustive with respect to embodying the invention.

DETAILED DESCRIPTION OF THE INVENTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the broadest scope consistent with the claims.

Disclosed are a system, method, and article of manufacture for augmented-reality simulations. Although the present embodiments have been described with reference to specific example embodiments, it will be evident that various modifications and changes may be made to these embodiments without departing from the broader spirit and scope of the various claims.

Figure 1:
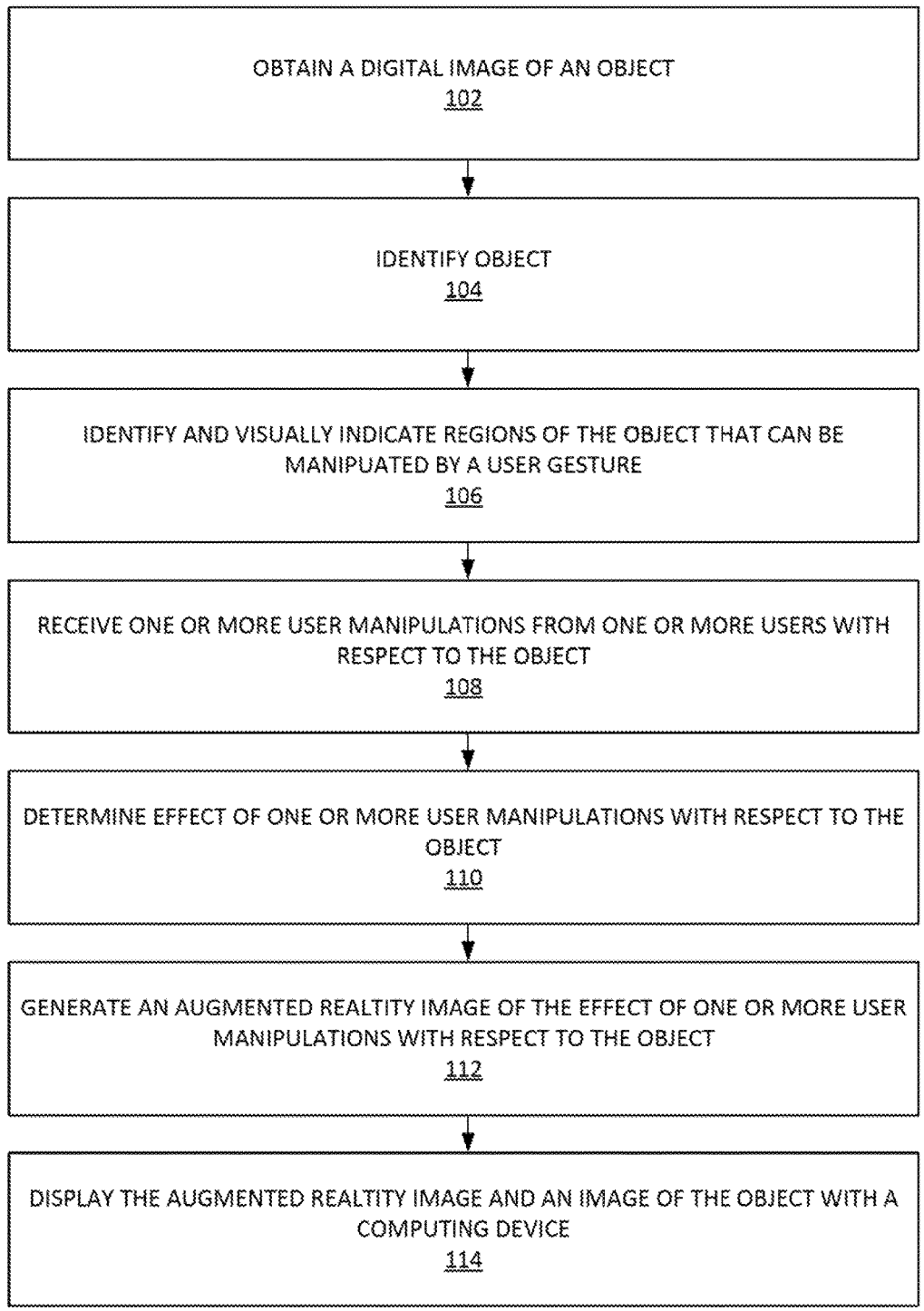
FIG. 1 illustrates an exemplary process for augmented-reality simulations of portion of real-world objects, according to some embodiments.

FIG. 1 illustrates an exemplary process 100 for augmented-reality simulations of portion of real-world objects, according to some embodiments. In step 102 of process 100, a digital image of an object is obtained. For example, the digital image can be obtained with a digital camera. The digital image can be displayed with a computer display device (e.g. smart phone and/or tablet computer display, a prism projector display on a head-mounted computer system, etc.). In step 104, one or more objects in the digital image can be identified. For example, various computer vision and image recognition technologies can be utilized to identify various elements of the content of the digital image. In another example, a user can manually identify various elements of the digital image. For example, a user can utilize a various digital image tagging techniques and the like. A user can input digital element identifiers as text and/or voice input in the computing device. This information can be provided to a server and/or local functionality that matches the user input with an object identity. In step 106, based on the object's identity, various regions of the digital image of the object may be subject to various forms of manipulation by a user's gesture. For example, augmented reality elements can be overlaid with these regions. User gestures can be set to alter the display and/or behavior of the augmented reality elements within the display (e.g. on-screen objects). For example, the user interface of computing device can utilize various direct manipulation patterns and actions such touch inputs that correspond to real-world actions, like swiping, tapping, pinching and reverse pinching to manipulate on-screen objects. Internal hardware such as accelerometers, gyroscopes and/or proximity sensors can also be used to respond to additional user actions, for example adjusting the screen from portrait to landscape depending on how the device is oriented. Further, in step 108, one or more user manipulations (e.g. the manipulation by user gesture supra) can be received from one or more users with respect to the object. It is noted that other users may be substantially simultaneously viewing the object and also manipulating various aspects of the object in a similar manner. All these manipulations can be stored. In some examples, a user may be able to access another user's manipulations and views and view these on the user's own computing device. For example, a user can send a hyperlink of his manipulations and/or other actions in the system to another user (e.g. via an online social network). Moreover, other users in a user's online social network can be enabled to view the user manipulations. Additionally, a hyperlink to a user's profile and/or other manipulations can be imbedded in a view of any manipulation performed by a user that is viewable by another user. Additionally, in some examples, hyperlink can be generated and imbedded in a manipulation that links a viewer to an image source (e.g. a website) where the image was obtained. These various hyperlinks can also include annotated text provided by various users (e.g. users linked in an online social network). In step 110, the effect of one or more user manipulations can be determined with respect to the object. In step 112, an augmented reality image of the effect of the one or more user manipulations with respect to the object can be generated. In step 114, the augmented reality image and the digital image of the object can be display with the computing device. Accordingly, in one example, the digital object can be an automobile. The region for manipulation by user gesture can be the hood of the automobile. An augmented reality element (e.g. a color overlay, a line, a text element, etc.) can be included on-screen to indicate the availability of the hood of the automobile for manipulation. With a 'swiping' gesture, the user can 'open' the hood of the automobile. The view under the automobile can be obtained from a stored image matched to the automobile (e.g. by type of automobile, by a previous image of the same automobile, etc.) and adjusted according to the present perspective of the user. It is noted that, in some embodiments, augmented-reality techniques can be enhanced such as by adding computer vision and object recognition. In some embodiments, process 100 can be implemented in a virtual reality environment, a mixture of a virtual reality and an augmented-reality environment and/or an augmented reality environment.

Exemplary Systems and Architecture

Figure 2:
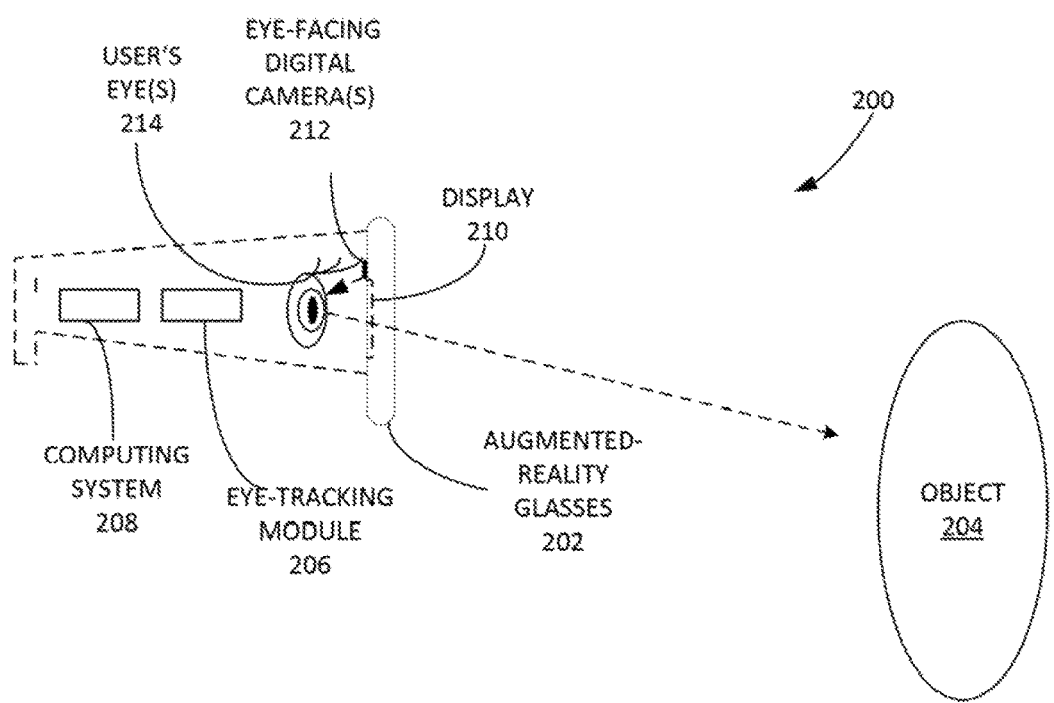
FIG. 2 illustrates a side view an augmented-reality glasses in an example embodiment.

FIG. 2 illustrates a side view an augmented-reality glasses 202 in an example embodiment. Although this example embodiment is provided in an eyeglasses format, it will be understood that wearable systems may take other forms, such as hats, goggles, masks, headbands and helmets. Augmented-reality glasses 202 may include an OHMD. Extending side arms may be affixed to the lens frame. Extending side arms may be attached to a center frame support and lens frame. Each of the frame elements and the extending side-arm may be formed of a solid structure of plastic or metal, or may be formed of a hollow structure of similar material so as to allow wiring and component interconnects to be internally routed through the augmented-reality glasses 202.

A lens display may include lens elements that may be at least partially transparent so as to allow the wearer to look through lens elements. In particular, a user's eye(s) 214 of the wearer may look through a lens that may include display 210. One or both lenses may include a display. Display 210 may be included in the augmented-reality glasses 202 optical systems. In one example, the optical systems may be positioned in front of the lenses, respectively. Augmented-reality glasses 202 may include various elements such as a computing system 208, user input device(s) such as a touchpad, a microphone, and a button. Augmented-reality glasses 202 may include and/or be communicatively coupled with other biosensors (e.g. with NFC, Bluetooth®, etc.). The computing system 208 may manage the augmented reality operations, as well as digital image and video acquisition operations. Computing system 208 may include a client for interacting with a remote server (e.g. augmented-reality (AR) messaging service, other text messaging service, image/video editing service, etc.) in order to send user bioresponse data (e.g. eye-tracking data, other biosensor data) and/or camera data and/or to receive information about aggregated eye tracking/bioresponse data (e.g., AR messages, and other data). For example, computing system 208 may use data from, among other sources, various sensors and cameras (e.g. outward facing camera that obtain digital images of object 204) to determine a displayed image that may be displayed to the wearer. Computing system 208 may communicate with a network such as a cellular network, local area network and/or the Internet. Computing system 208 may support an operating system such as the Android™ and/or Linux operating system.

The optical systems may be attached to the augmented reality glasses 202 using support mounts. Furthermore, the optical systems may be integrated partially or completely into the lens elements. The wearer of augmented reality glasses 202 may simultaneously observe from display 210 a real-world image with an overlaid displayed image. Augmented reality glasses 202 may also include eye-tracking system(s) that may be integrated into the display 210 of each lens. Eye-tracking system(s) may include eye-tracking module 208 to manage eye-tracking operations, as well as, other hardware devices such as one or more a user-facing cameras and/or infrared light source(s). In one example, an infrared light source or sources integrated into the eye-tracking system may illuminate the eye(s) 214 of the wearer, and a reflected infrared light may be collected with an infrared camera to track eye or eye-pupil movement.

Other user input devices, user output devices, wireless communication devices, sensors, and cameras may be reasonably included and/or communicatively coupled with augmented-reality glasses 202. In some embodiments, augmented-reality glass 202 may include a virtual retinal display (VRD). Computing system 208 can include spatial sensing sensors such as a gyroscope and/or an accelerometer to track direction user is facing and what angle her head is at.

Figure 3:
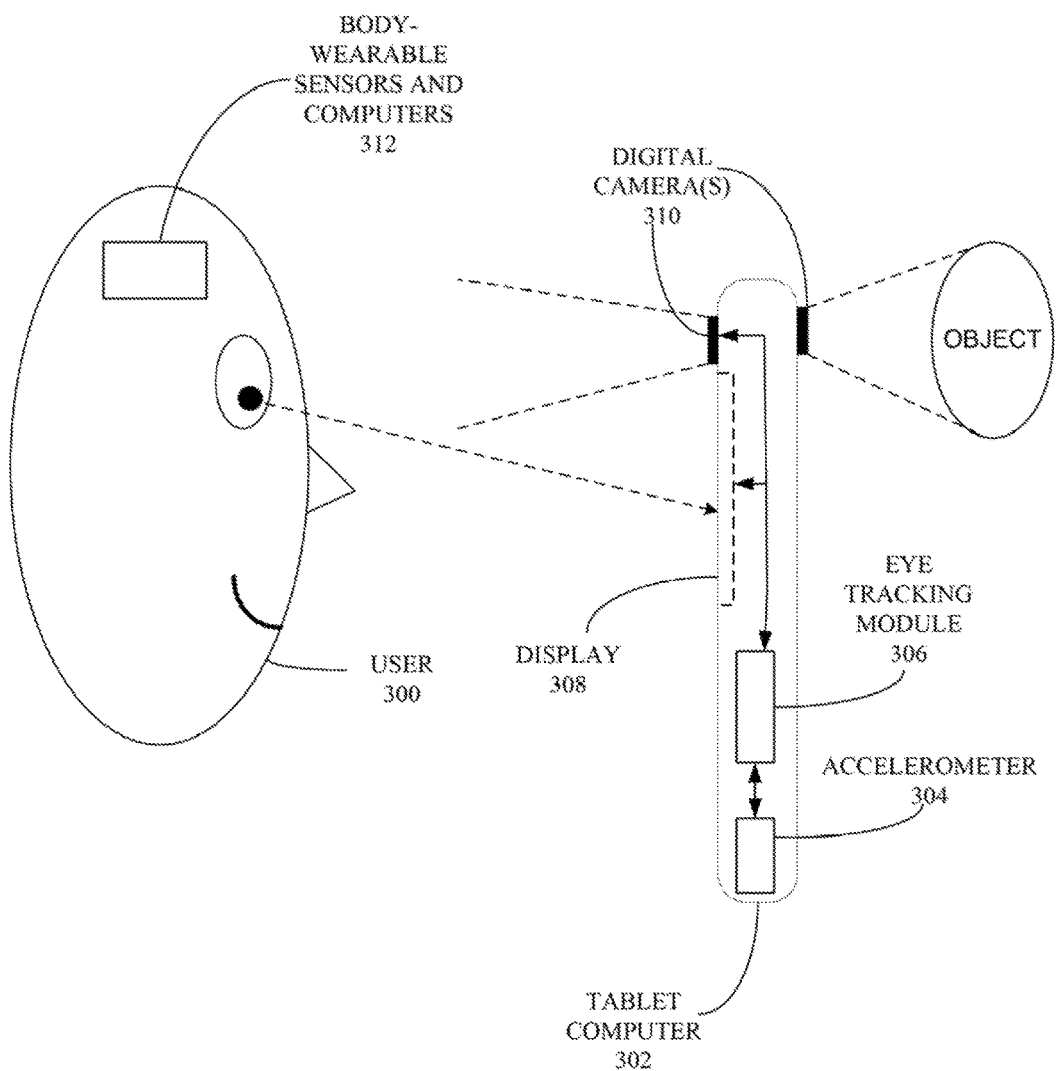
FIG. 3 depicts an exemplary computing system configured to perform any one of the processes described herein, according to an example embodiment.

FIG. 3 illustrates one example of obtaining biosensor data from a user who is viewing a digital document presented by a computer display. In this embodiment, user-tracking module 306 of tablet computer 302 tracks the gaze of user 300. Although illustrated here as a tablet computer 302 (such as an iPad®), the device may be a cellular telephone, personal digital assistant, laptop computer, body-wearable computer, augmented-reality glasses, other head-mounted display (HMD) systems, desktop computer, or the like. Additionally, although illustrated here as a digital document displayed by a tablet computer, other embodiments may obtain eye-tracking and other bioresponse data for other types of displays of a digital document (e.g. a digital billboard, augmented-reality displays, etc.) and/or physical objects and/or persons. User-tracking module 306 may utilize information from at least one digital camera(s) 310 (may include infrared or other applicable light source, one or more digital cameras may face the user and/or the object) and/or an accelerometer 304 (or similar device that provides positional information of user device 300 such as a gyroscope) to track the user's gaze (e.g. broken lined arrow from eye of user 300). User-tracking module 306 may map eye-tracking data to information presented on display 308. For example, coordinates of display information may be obtained from a graphical user interface (GUI). Various eye-tracking algorithms and methodologies (such as those described herein) may be utilized to implement the example shown in FIG. 3. User-tracking module 306 may also track user body motions and/or location sensors worn by the user (e.g. in a ring on the user's finger). In this way, user manipulation gestures can be obtained and identified.

Various gesture (e.g. information from users which is not conveyed through speech or type) recognition techniques can be utilized to interpret human gestures via mathematical algorithms. Exemplary gesture recognition techniques can include, inter alia: sign language recognition; sensors (accelerometers and gyros) worn on the user's body produce values that are read to determine a user gesture; directional indication through pointing; control through facial gestures; other hand and body-part gestures; etc. Gesture associated input devices can include, inter alia, wired gloves, digital cameras such as depth-aware cameras, controller-based gestures, etc. Computer vision methods (e.g. including such sub-domains of computer vision as scene reconstruction, event detection, video tracking, object recognition, learning, indexing, motion estimation, and/or image restoration) can be utilized for both gesture input and/or object recognition.

In some embodiments, user-tracking module 306 may utilize an eye-tracking method to acquire the eye movement pattern. In one embodiment, an example eye-tracking method may include an analytical gaze estimation algorithm that employs the estimation of the visual direction directly from selected eye features such as irises, eye corners, eyelids, or the like to compute a user gaze direction, if the positions of any two points of the nodal point, the fovea, the eyeball center or the pupil center may be estimated, the visual direction may be determined. It is noted that the functionalities of user-tracking module 306 can be incorporated into system 200 as well.

In addition, a light may be included on the front side of tablet computer 302 to assist detection of any points hidden in the eyeball. Moreover, the eyeball center may be estimated from other viewable facial features indirectly. In one embodiment, the method may model an eyeball as a sphere and hold the distances from the eyeball center to the two eye corners to be a known constant. For example, the distance may be fixed to 6 mm. The eye corners may be located (for example, by using a binocular stereo system) and used to determine the eyeball center. In one exemplary embodiment, the iris boundaries may be modeled as circles in the image using a Hough transformation.

The center of the circular iris boundary may then be used as the pupil center. In other embodiments, a high-resolution camera and other image processing tools may be used to detect the pupil. It should be noted that, in some embodiments, user-tracking module 306 may utilize one or more eye-tracking methods in combination. Other exemplary eye-tracking methods include: a 2D eye-tracking algorithm using a single camera and Purkinje image, a real-time eye-tracking algorithm with head movement compensation, a real-time implementation of a method to estimate user gaze direction using stereo vision, a free head motion remote eyes (REGT) technique, or the like. Additionally, any combination of any of these methods may be used.

Body wearable sensors and/or computers 312 may include any type of user-wearable biosensor and computer described herein. In a particular example, body wearable sensors and/or computers 312 may obtain additional bioresponse data from a user. This bioresponse data may be correlated with eye-tracking data. For example, eye-tracking tracking data may indicate a user was viewing an object and other bioresponse data may provide the user's heart rate, galvanic skin response values and the like during that period. Body-wearable sensors can be integrated into various elements of augmented-reality glasses 202 as well. For example, sensors can be located into a nose bridge piece, lens frames and/or side arms.

In some embodiments, system 300 can be utilized to generate a social graph. As used herein, a social graph can include a graph that depicts personal relations of internet users. The social graph can include a social network (e.g. an explicit social network, an implicit social network). For example, common and/or similar manipulations of various users with respect to a certain manipulable portion can be used to generate a link between the users in a social graph. Links can be weighted based on such factors as duration of a user's interaction with a manipulable portion, number of interactions of the user with the manipulable portion, length of a user's annotation embedded by a user in the manipulable portion, etc. In some examples, a sociomapping method for processing and visualization of relational data (e.g. social network data derived from common/similar user interactions with a one or more manipulable portions). A sociomapping method can use a data-landscape metaphor, creating a visually coded picture resembling a map that can be interpreted with similar rules as navigation in the landscape. This can be viewable by various users of system 300 (e.g. users connected via another online social network as 'friends' and/or 'followers'). For example, the picture can be depicted as a sociomapping. In one example, a first user can interact with one or more manipulable portions of a well-known building. A second user can also interact with one or more manipulable portions of the well-known building. The two users can then be linked together in the social graph. If the user is also 'friends' (and/or other form of explicit connection) in an online social network, then the users can be informed of the social graph linkage. In some examples, social graph information can be provided to third parties for analysis and marketing. In some examples, social graph information can be used to annotate augmented reality elements associated with related manipulable portions. It is noted that manipulable portions can be linked in the social graph along with their associated photo recognized image (e.g. a parent image). Manipulable portions can also be linked to a certain virtual interior view that can inform the virtual exterior view that is initially viewed. A user can use public persona and personal filters as well to generate a more personalized social graph. This can be a blending of the personal social graph. This can be a hybrid manipulable portion/parent image/virtual interior view of a personalized social graph.

In one example, this can be used to create a search style result with recursive properties. The user can use filters to generate a public persona, which acknowledges the user's personal side. User personas can be stored and a database of historical public personas can be maintained. These can be used to generate and/or filter the user's personalized annotations (as opposed to a common annotation experience).

Example Processes

Figure 4:
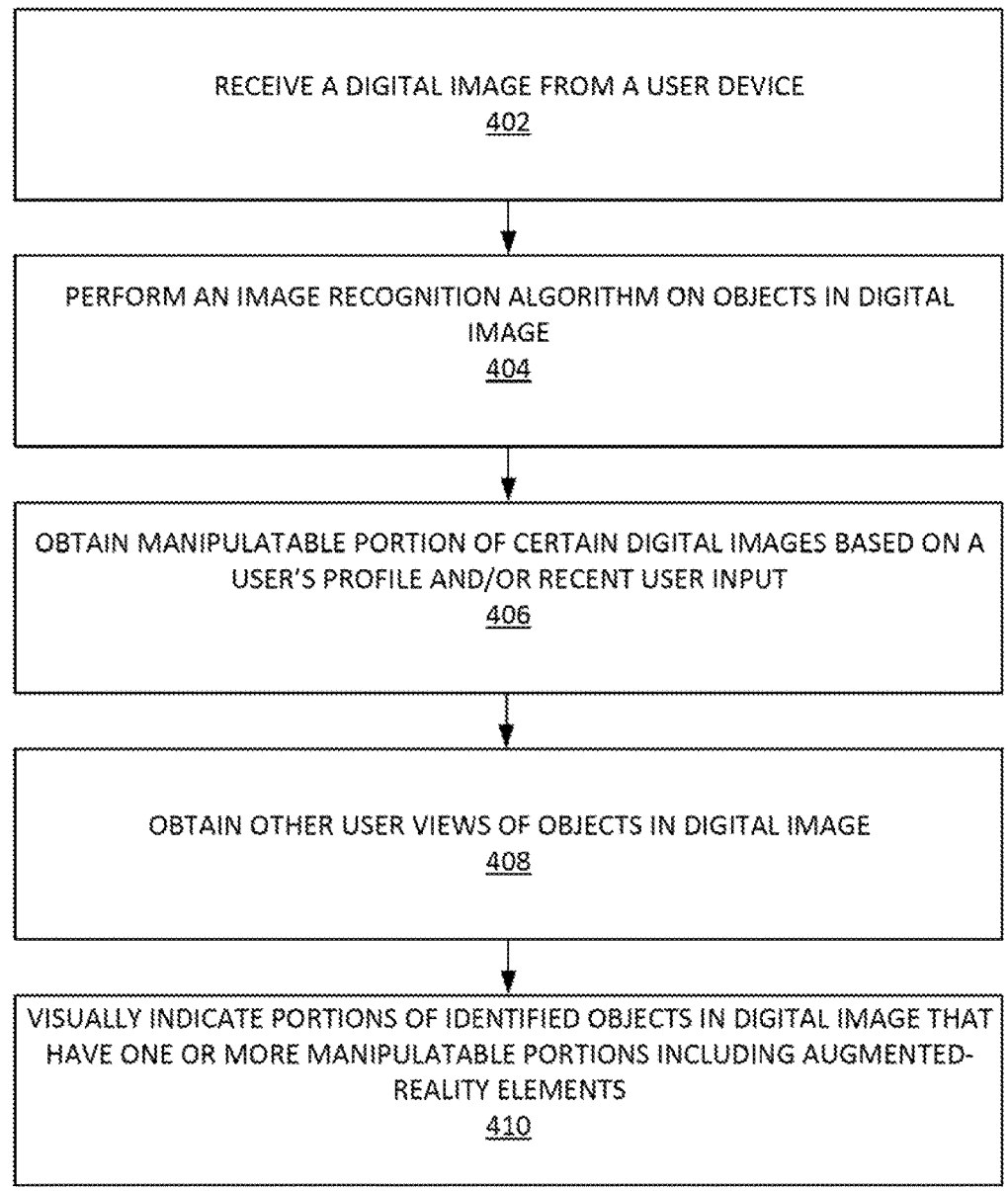
FIG. 4 provides a process of visually indicating manipulable portions of a digital image, according to some embodiments.

FIG. 4 provides a process 400 of visually indicating manipulable portions of a digital image, according to some embodiments. In step 402, a digital image is received form a user device. The user device can include a digital camera and a computer display. The digital image can be obtained by the digital camera and automatically selected because it is currently displayed on the computer display. In step 404, one or more image recognition algorithms (and/or other computer vision processes) can be performed on the digital image to identify objects in the digital image. In step 406, a set of manipulable portions of identified objects in the digital image can be obtained. For example, a library of predefined manipulable portions of various objects can be maintained in a database (e.g. augmented-reality elements database 720 and/or other databases 722). The library can include various digital views of the augmented reality aspects of the manipulable portions as well as digital images of the various objects viewable at different angles. Moreover, the library can include internal views of the various objects. For example, if the object is a certain automobile, then the internal view can be a set of views of pre-obtained digital images of the automobile's components under the automobile's hood. Furthermore, additional digital images of the views internal to the various automobile's components can be obtained as well. A user's profile can be maintained. The user profile (e.g. user profiles 714 A-C of FIG. 7 infra) can include various information about the user such as profession, demographic information, web browser history, user interests, user educational background, user travel background, and the like. User profile information can be used to obtain relevant manipulable portions of the certain objects. For example, a user with a profile that indicates an interest in automobile mechanics can be viewing an automobile via the augmented-reality glasses 202. The user's profile information can be used to determine a set of manipulable portions of the automobile that are related to automobile information such as the hood of the automobile and/or various automobile components. The step of obtaining manipulable portions can also be based on received user input (e.g. user gestures that indicate objects in the digital image that the user would like to manipulate).

In step 408, other user views (and/or previously performs manipulations) of objects currently viewed in the digital image can also be obtained. For example, another user may have already lifted an augmented-reality element representing the hood of the automobile the viewing. This view of the augmented-reality hood element and/or an augmented-reality view of the automobile's components located under the hood that were provided to the other user can also be obtained and provided to the user. In some examples, only other user views that are relevant to a user's profile and/or recently inputs may be obtained and/or displayed to the user.

In step 410, the manipulable portions that were selected in step 406 can be visually indicated (e.g. with augmented-reality elements that overlay the user's view of the digital image on the user's computer display). It is noted that certain steps of process 400 can be repeated with respect to manipulable portions, augmented-reality elements and/or other digital images (e.g. those obtained from another user's computing device, new objects in user's view as user moves the digital camera portion of the computing device, etc.). In this way, a new set of manipulable portions for new objects and/or new views of objects can be obtained and displayed as augmented-reality overlays to the user.

Figure 5:
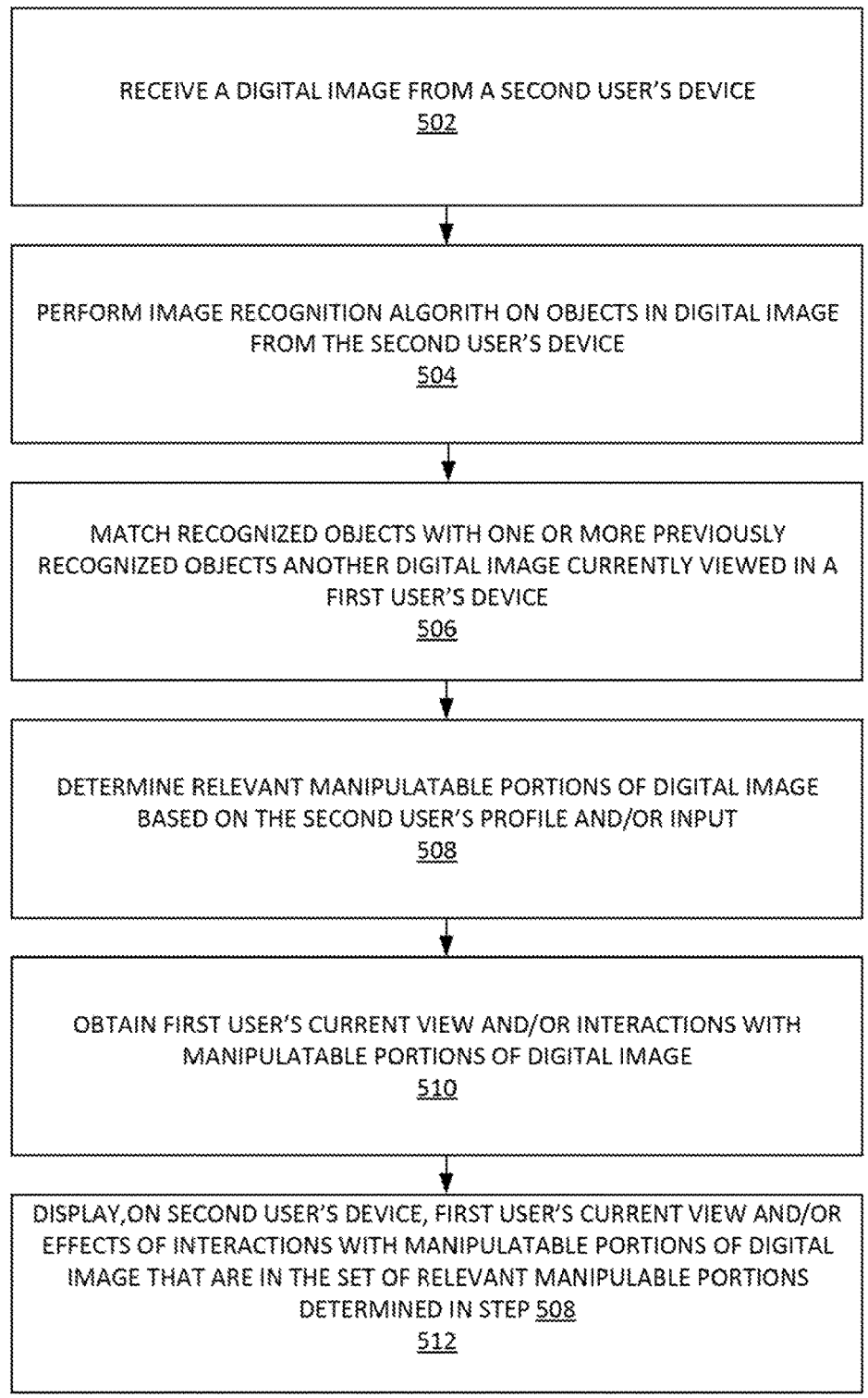
FIG. 5 a process of displaying a first user's view and/or interactions with manipulable portions of the first user's view on a second user's computing device, according to some embodiments.

FIG. 5 a process 500 of displaying a first user's view and/or interactions with manipulable portions of the first user's view on a second user's computing device, according to some embodiments. In step 502, a digital image can be received from a second user's computing device. In step 504, one or more image recognition algorithms (and/or other computer vision processes) can be performed on the digital image to identify objects in the digital image. In step 506, identified objects can be matched with one or more objects previously identified in currently (and/or previously in some examples) viewed in a first user's device. In step 508, relevant manipulable portions of the digital image can be determined based on the second user's profile and/or input. In step 510, a first user's current (and/or previously in some examples) and/or interactions with the manipulable portions of the digital image can be obtained. In step 512, a first user's current (and/or previously in some examples) view and/or effect(s) of interactions with manipulable portions of digital image that are in the set of relevant manipulable portions determined in step 508 can be displayed on the second user's device.

Figure 6:
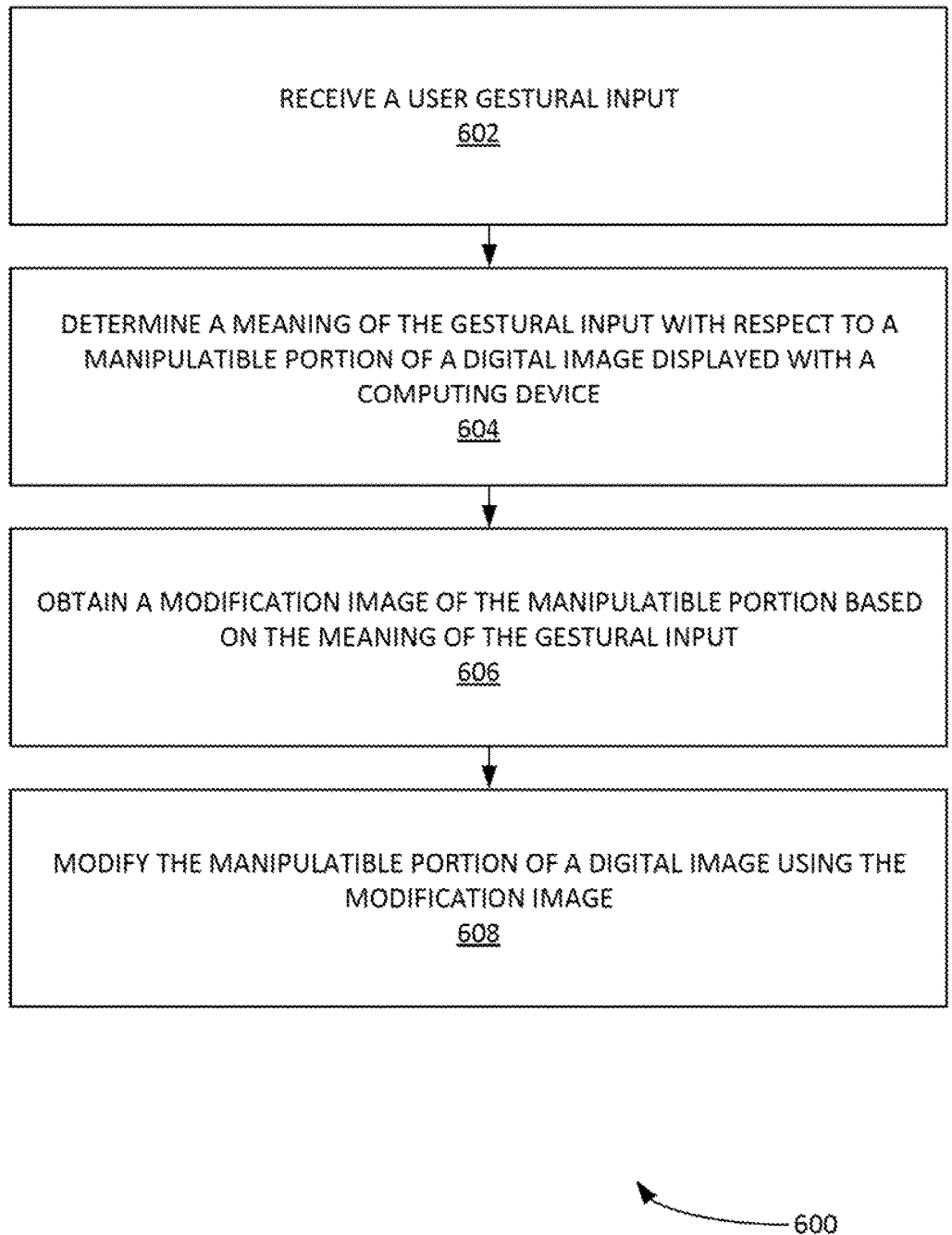
FIG. 6 illustrates an example process of modifying manipulable portions (e.g. augmented-reality elements overlaying a source digital image obtained by a digital camera) of a digital image, according to some embodiments.

FIG. 6 illustrates an example process 600 of modifying manipulable portions (e.g. augmented-reality elements overlaying a source digital image obtained by a digital camera) of a digital image, according to some embodiments. In step 602, a gestural input is received (e.g. using gesture recognition algorithm detecting hand location and movement). The gestural input can be a touch-screen gesture input, typed input, pen computing and/or speech input. In another example, the gestural input can be obtained by digital cameras. For examples, digital images of hand and/or other body gestures can be captured and interpreted as user input. For example, a user can use a digital camera to obtain a digital image of his finger point at a hood of an automobile. The hood of the automobile can be a manipulable portion of the digital image. In this way, can cause a specified function of the manipulable portion of the hood to be modified in some manner. Various special gesture models can be utilized to implement step 602. Example spatial gesture models can include, inter alia: 3D model-based algorithms; skeletal-based algorithms; sign-language recognition; control through facial gestures; affective computing inputs; and/or appearance-based models. Various input devices can be utilized such as wired gloves, in-depth cameras, stereo cameras, controller-based gestures, and/or single 20 cameras. Gestures can be used to control interactions within video games to try and make the game player's experience more interactive or immersive, these gestures can also be utilized, in some embodiments, to implement process 600.

In step 604, a meaning of the gestural input is determined with respect to manipulable portion of the digital image is determined. For example, a gestural input can be identified with computer vision techniques. A manipulative portion can be identified as associated with the gestural input. A table can be utilized to match gestural inputs and their meaning. A meaning of a gestural input can be a particular manipulation of the manipulative portion (e.g. open a lid, display a component underneath a surface, obtain and display another user's view of the same object, etc.). In step 606, a modification image of the manipulable portion can be obtained based on the meaning of the gestural input (e.g. rotating, opening, and other gestural inputs). Modification images can be stored in a database. In step 608, the manipulable portion of the digital image is modified using the modification image (e.g. based on an interpreted meaning of the user gestural input such as a twisting gesture is interpreted to mean open an aperture in the manipulable portion, etc.). For example, the modification image can be interpolated into and/or overlain the underlying digital image being viewed by the user.

Additional Exemplary Environment and Architecture

Figure 7:
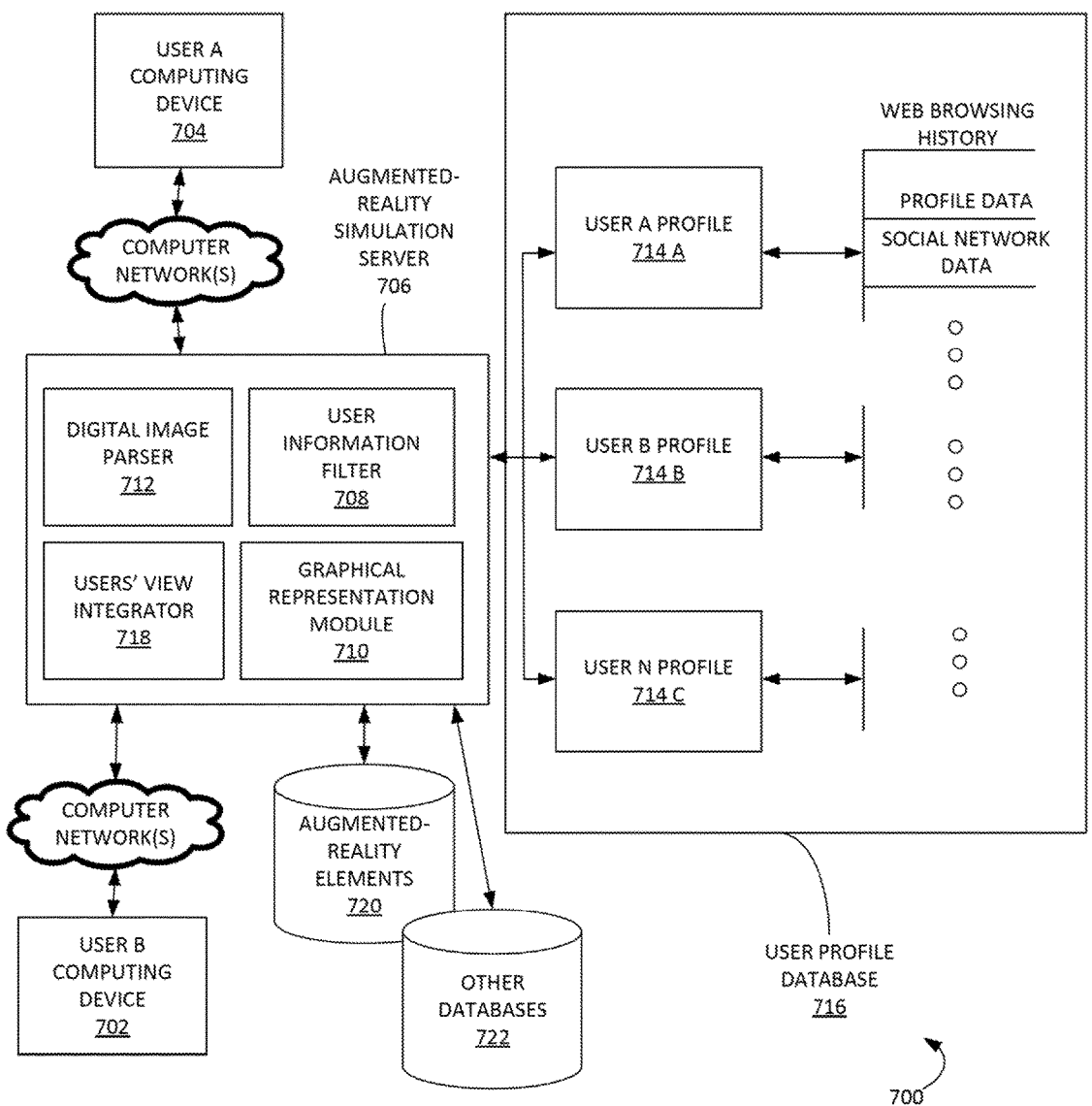
FIG. 7 illustrates a computing system for augmented-reality simulations, according to some embodiments.

FIG. 7 illustrates a computing system 700 for augmented-reality simulations, according to some embodiments. Computing system 700 can be utilized to perform processes described herein such as processes 100, 400, 500 and/or 600. Computing system 700 can include an augmented-reality simulation server 706. Augmented-reality simulation server 700 can obtain information (e.g. digital images, user identity, location data, device display information, etc.) from computing devices 702 and/or 704. For example, augmented-reality simulation server 700 can received this information from a client application operating in computing devices 702 and/or 704.

Digital images received by augmented-reality simulation server 700 can be parsed by digital image parser 712. Digital image parser 712 can implement various image recognition and/or other computer vision techniques on received digital images to identify portions of the digital image. Augmented-reality elements can then be selected and matched with the various portions of the digital image. In some examples, user information filter 708 can filter available augmented-reality portions and select only augmented-reality elements that are somehow relevant to a viewing user (e.g. based on a user's profile, user's location, and the like). For example, user information filter 708 can compare available augmented-reality portions with items in user-profile database 716 and select a set of augmented-reality portions relevant to the content of user-profile database 716. User information filter 708 can also filter augmented-reality portions based on other criteria as well such as those discussed supra.

Selected augmented-reality portions can then be provided to graphical representation module 710. Graphical representation module 710 can provide a visual element for the display of the augmented-reality portions in a graphical user interface (GUI) (e.g. a GUI of devices 702 and/or 704). Graphical representation module 710 can include various functionalities for altering digital images from devices 702 and/or 704 to include augmented-reality elements (e.g. can overlay augmented-reality elements over relevant portions of digital images). Graphical representation module 710 can also include functionalities for additional image modification such as for: automatic image enhancement, digital data compression, image size alteration, change color depth, in painting, contrast change and brightening, gamma correction, image cropping, homomorphic filtering, script dynamic imaging, batch dynamic imaging, real-time dynamic imaging, noise reduction, color modification, removal of unwanted elements, perspective control and distortion, selecting and merging of images, and the like. For example, an image selecting and merging of images functionality can implement various digital compositing techniques (e.g. silhouetting, clipping paths, use of transparent layers, slicing of images, performing an image merge, alpha compositing etc.) to integrate the augmented-reality element with the original digital image. Graphical representation module 710 can include various image editors programs for the automatic modification of images based on preset parameters (e.g. raster graphics editor; special effects editor; painting editor; an imaging server allows real-time rendering of images, text, logos and colorization based on internal and external data sources, etc.).

Graphical representation module 710 can also receive user input (e.g. via a client application in devices 702 and/or 704). Based on user input, graphical representation module 710 can implement an outlining of an area that includes a manipulable portion of the digital image. This can be performed with an overlay of an augmented-reality element. The outlining of an area in the digital image can be provided to the GUI of a computing device (e.g. devices 702 and/or 704) for display to a user. Graphical representation module 710 can include a simulation engine (such as simulation engine 8 provided infra). The simulation engine can model/reproduce behavior of a system of the augmented-reality elements and real-world elements displayed to the user. The modeled/reproduced behavior can be based on modifying the digital image according to a user input (e.g. flicking open the hood of a vehicle, turning an augmented-reality element around, etc.). In another example, a user can be standing in front of a vehicle viewing the hood of the vehicle. The user can virtually 'lift' the hood of the vehicle (e.g. indicate the displayed image should be modified by performing a hand gesture with respect to the real-world image of the hood of the vehicle). An augmented-reality element of a lifted hood of the vehicle and vehicle components (e.g. a virtual view of the engine where the image engine in the augmented-reality view is from a database, etc.) can be overlapped with the real-world image of the hood of the vehicle. The user can then virtually manipulate the various vehicle components (e.g. turn them, pull them out and obtain various perspective views, open them and view virtual views of their respective components, etc.). These virtual views (e.g. an augmented-reality view) can be augmented-reality elements obtained from augmented-reality elements database 720. Additional virtual views can be obtained by identifying the corresponding real-world element, querying a third party database, obtaining a digital image of the corresponding real-world element and generating an augmented-reality element from the digital image. This can be performed automatically in the event the augmented-reality elements database 720 does not include a relevant augmented-reality element.

More generally, a virtual environment with "real world" dimensions can be provided in some example embodiments. Dimensional value can be ascertained and use to map a physical (e.g. non-virtual) world environment.

Figure 8:
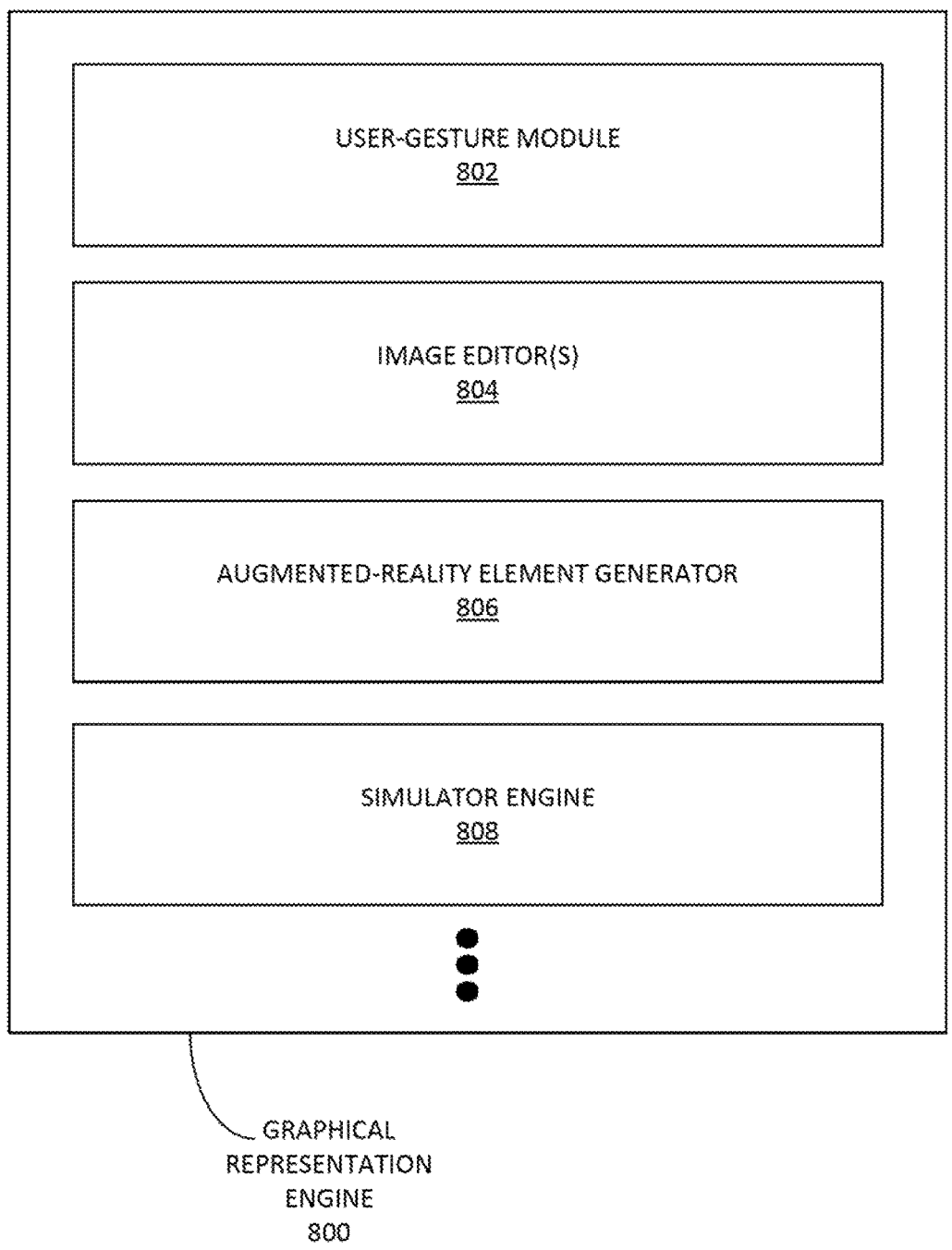
FIG. 8 illustrates in block-diagram format an example graphical-representation model, according to some embodiments.

FIG. 8 illustrates in block-diagram format an example graphical-representation model 800, according to some embodiments. Graphical-representation model 800 can implement the various functionalities provided supra with respect to the description of graphical representation module 710. For example, graphical-representation model 800 can include a user-gesture module 802. User-gesture module 802 can receive data about user gesture input (e.g. obtained from a user-worn sensor, digital camera, touchscreen, key board, etc.). User-gesture module 802 can interpret a user gesture and provide instructions for the modification of a digital image (e.g. a digital image currently viewed by the user) accordingly. User-gesture module 802 can include image editor(s) 804 to modify the digital image based on such factors as user-gesture inputs, augmented-reality element integration, and the like. As used here, 'augmented reality' can include a live, direct or indirect, view of a physical, real-world environment whose elements are augmented (and/or supplemented) by computer-generated sensory input such as sound, video, graphics and/or GPS data. User-gesture module 802 can include augmented-reality element generator 806. Augmented-reality element generator 806 can automatically generate augmented-reality elements and/or retrieve them from a database for use by image editor 804. User-gesture module 802 can include simulator engine 808. Simulator engine 808 can model/reproduce behavior of a system of the augmented-reality elements and real-world elements displayed to the user. Simulator engine 808 can build models of that analyze the physical properties of digital image content and/or augmented-reality elements (e.g. algorithms and equations used to capture their behavior based on a user gesture input such a turn, dropping, throwing, rolling, modifying a depth of view of an augmented-reality element and the like). A computer simulation can then be run that contains these equations and/or algorithms as well as variables that represent an approximated real-world property (e.g. weight) of the digital image content and/or augmented-reality elements. Simulation, therefore, refers to the result of running a model. Simulator engine 808 can query third-party sources such as websites and/or other databases to obtain values for variables that represent an approximated real-world property of the digital image content and/or augmented-reality elements. Simulation, therefore, refers to the result of running a model. Simulator engine 808 can use graphical environments to design simulations. Simulator engine 808 can use open source libraries such as 'Open Source Physics' (and/or another source for drawing and plotting, differential equation solvers, exporting to animated GIFs and movies, etc., tools, and compiled simulations for physics and other numerical simulations) and/or 'Easy Java Simulations' (and/or another graphical environment that generates code) to develop reusable libraries for simulations and/or model generation. In some examples, various aspects of the simulations can be graphically represented and/or integrated into the current display of the digital image content and/or augmented-reality elements shown to the user.

Figure 9:
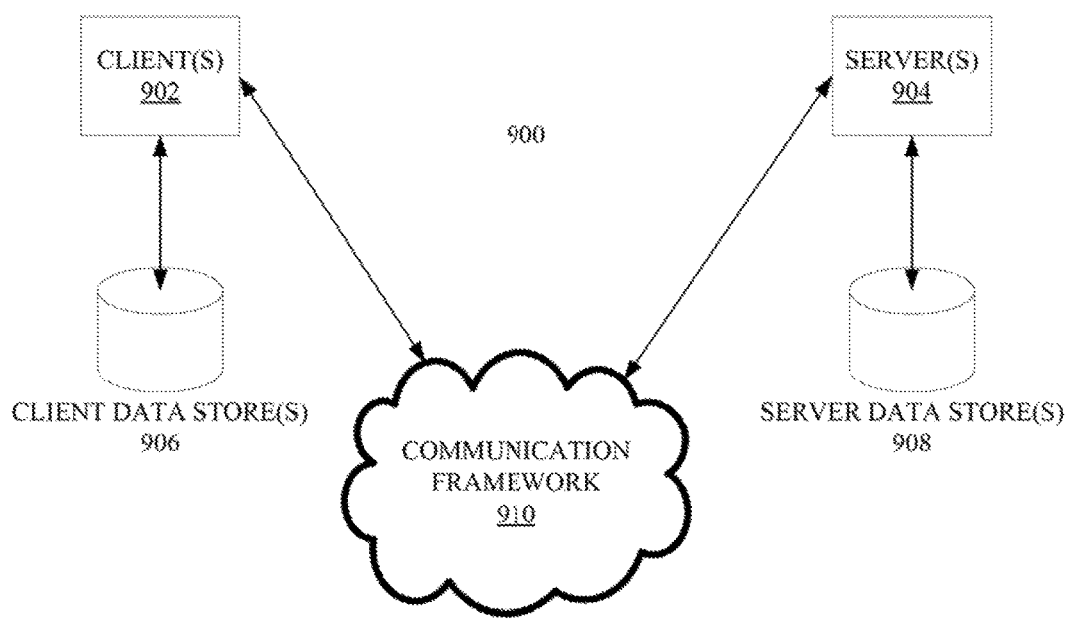
FIG. 9 illustrates another block diagram of a sample computing environment with which embodiments may interact.

FIG. 9 illustrates another block diagram of a sample computing environment 900 with which embodiments may interact. The system 900 further illustrates a system that includes one or more clients 902. The client(s) 902 may be hardware and/or software (e.g., threads, processes, computing devices). The system 900 also includes one or more servers 904. The server(s) 904 may also be hardware and/or software (e.g., threads, processes, computing devices). One possible communication between a client 902 and a server 904 may be in the form of a data packet adapted to be transmitted between two or more computer processes. The system 900 includes a communication framework 910 that may be employed to facilitate communications between the client(s) 902 and the server(s) 904. The client(s) 902 are connected to one or more client data stores 906 that may be employed to store information local to the client(s) 902. Similarly, the server(s) 904 are connected to one or more server data stores 908 that may be employed to store information local to the server(s) 904.

Figure 10:
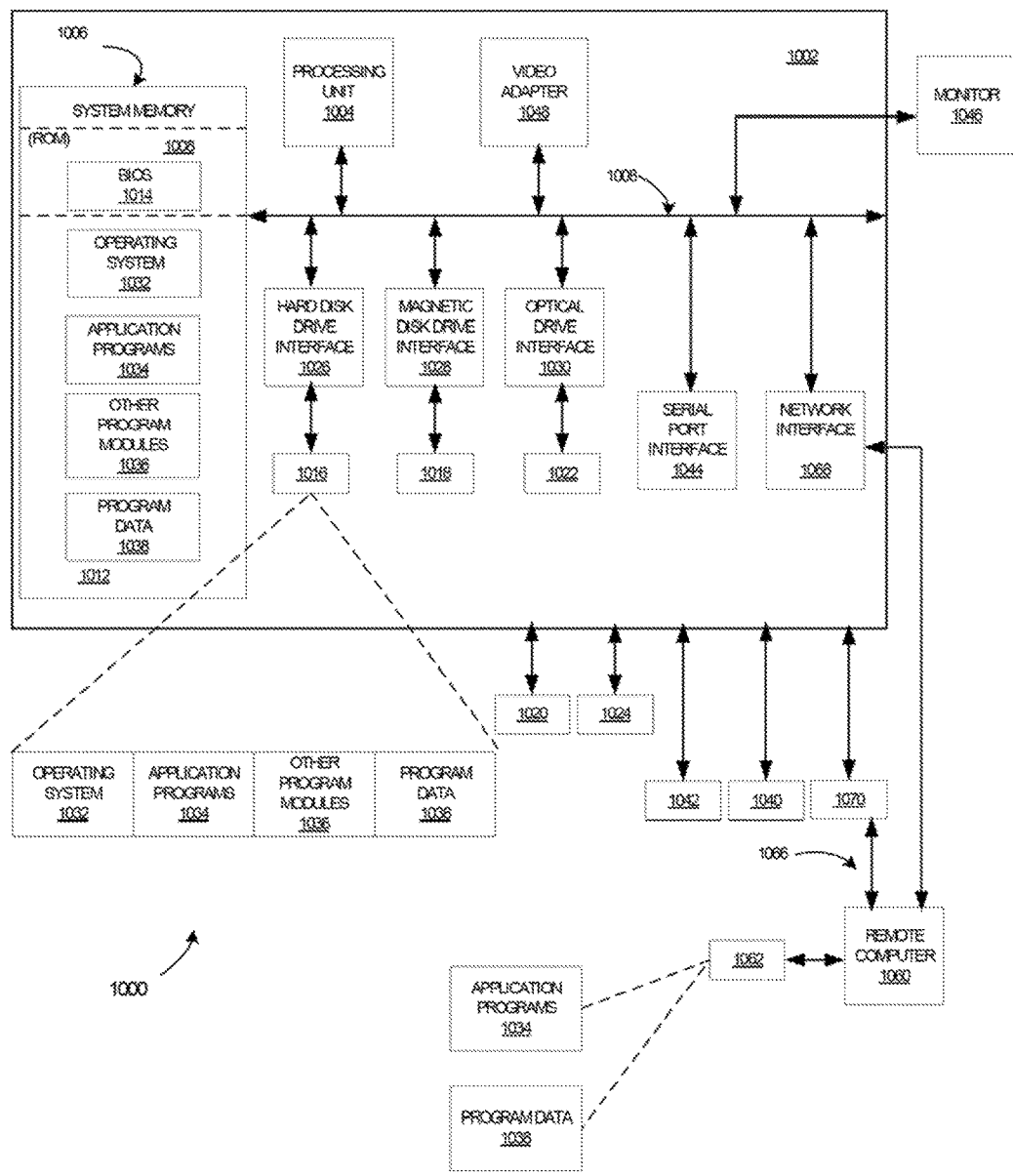
FIG. 10 is a diagram illustrating an exemplary system environment configurable to perform any one of the described processes.

FIG. 10 is a diagram illustrating an exemplary system environment 1000 configured to perform any one of the above-described processes. The system includes a conventional computer 1002. Computer 1002 may include circuitry or other specialized hardware for carrying out some or all aspects of the processes. In some operational settings, computer 1002 may be configured as a system that includes one or more units, each of which is configured to carry out some aspects of the processes either in software, hardware, or some combination thereof. In FIG. 10, computer 1002 includes a processing unit 1004, a system memory 1006, and a system bus 1008 that couples various system components, including the system memory, to the processing unit 1004. The processing unit 1004 may be any commercially available or proprietary processor. In addition, the processing unit may be implemented as multi-processor formed of more than one processor, such as may be connected in parallel.

The system bus 1008 may be any of several types of bus structure including a memory bus or memory controller, a peripheral bus, and a local bus using any of a variety of conventional bus architectures such as PCI, VESA, Microchannel, ISA, EISA, or the like. The system memory 1006 includes read only memory (ROM) 1010 and random access memory (RAM) 1012. A basic input/output system (BIOS) 1014, containing the basic routines that help to transfer information between elements within the computer 1002, such as during startup, is stored in ROM 1010.

At least some values based on the results of the above-described processes can be saved for subsequent use. The computer 1002 also may include, for example, a hard disk drive 1016, a magnetic disk drive 1018, e.g., to read from or write to a removable disk 1020, and an optical disk drive 1022, e.g., for reading from or writing to a CD-ROM disk 1024 or other optical media. The hard disk drive 1016, magnetic disk drive 1018, and optical disk drive 1022 are connected to the system bus 1008 by a hard disk drive interface 1026, a magnetic disk drive interface 1028, and an optical drive interface 1030, respectively. The drives 1016-1022 and their associated computer-readable media may provide nonvolatile storage of data, data structures, computer-executable instructions, or the like, for the computer 1002. The computer program may be written, for example, in a general-purpose programming language (e.g., Pascal, C, C++, Java) or some specialized application-specific language. Although the description of computer-readable media above refers to a hard disk, a removable magnetic disk, and a CD, it should be appreciated by those skilled in the art that other types of media which are readable by a computer, such as magnetic cassettes, flash memory, digital video disks, Bernoulli cartridges, or the like, may also be used in the exemplary operating environment 1000, and further that any such media may contain computer-executable instructions for performing the methods of the embodiments.

A number of program modules may be stored in the drives 1016-1022 and RAM 1012, including an operating system 1032, one or more application programs 1034, other program modules 1036, and program data 1038. The operating system 1032 may be any suitable operating system or combination of operating systems. By way of example, the application programs 1034 and program modules 1036 may include a location annotation scheme in accordance with an aspect of an embodiment. In some embodiments, application programs may include eye-tracking modules, facial recognition modules, parsers (e.g., natural language parsers), lexical analysis modules, text-messaging argot dictionaries, dictionaries, learning systems, or the like.

A user may enter commands and information into the computer 1002 through one or more user input devices, such as a keyboard 1040 and a pointing device (e.g., a mouse 1042). Other input devices (not shown) may include a microphone, a game pad, a satellite dish, a wireless remote, a scanner, or the like. These and other input devices are often connected to the processing unit 1004 through a serial port interface 1044 that is coupled to the system bus 1008, but may be connected by other interfaces, such as a parallel port, a game port, or a universal serial bus (USB). A monitor 1046 or other type of display device is also connected to the system bus 1008 via an interface, such as a video adapter 1048. In addition to the monitor 1046, the computer 1002 may include other peripheral output devices (not shown), such as speakers, printers, etc.

It is to be appreciated that the computer 1002 may operate in a networked environment using logical connections to one or more remote computers 1060. The remote computer 1060 may be a workstation, a server computer, a router, a peer device, or other common network node, and typically includes many or all of the elements described relative to the computer 1002, although for purposes of brevity, only a memory storage device 1062 is illustrated in FIG. 10. The logical connections depicted in FIG. 10 may include a local area network (LAN) 1064 and a wide area network (WAN) 1066. Such networking environments are commonplace in offices, enterprise-wide computer networks, intranets, and the Internet.

When used in a LAN networking environment, for example, the computer 1002 is connected to the local network 1064 through a network interface or adapter 1068. When used in a WAN networking environment, the computer 1002 typically includes a modem (e.g., telephone, DSL, cable, etc.) 1070, is connected to a communications server on the LAN, or has other means for establishing communications over the WAN 1066, such as the Internet. The modem 1070, which may be internal or external relative to the computer 1002, is connected to the system bus 1008 via the serial port interface 1044. In a networked environment, program modules (including application programs 1034) and/or program data 1038 may be stored in the remote memory storage device 1062. It will be appreciated that the network connections shown are exemplary and other means (e.g., wired or wireless) of establishing a communications link between the computers 1002 and 1060 may be used when carrying out an aspect of an embodiment.

In accordance with the practices of persons skilled in the art of computer programming, the embodiments have been described with reference to acts and symbolic representations of operations that are performed by a computer, such as the computer 1002 or remote computer 1060, unless otherwise indicated. Such acts and operations are sometimes referred to as being computer-executed. It will be appreciated that the acts and symbolically represented operations include the manipulation by the processing unit 1004 of electrical signals representing data bits, which causes a resulting transformation or reduction of the electrical signal representation (e.g. non-transitive signals), and the maintenance of data bits at memory locations in the memory system (including the system memory 1006, hard drive 1016, floppy disks 1020, CD-ROM 1024, and remote memory 1062) to thereby reconfigure or otherwise alter the computer system's operation, as well as other processing of signals. The memory locations where such data bits are maintained are physical locations that have particular electrical, magnetic, or optical properties corresponding to the data bits.

In some embodiments, system environment may include one or more sensors (not shown). In certain embodiments, a sensor may measure an attribute of a data environment, a computer environment, and a user environment, in addition to a physical environment. For example, in another embodiment, a sensor may also be a virtual device that measures an attribute of a virtual environment such as a gaming environment. Example sensors include, inter alia, global positioning system receivers, accelerometers, inclinometers, position sensors, barometers, WiFi sensors, RFID sensors, near-field communication (NFC) devices, gyroscopes, pressure sensors, pressure gauges, time pressure gauges, torque sensors, ohmmeters, thermometers, infrared sensors, microphones, image sensors (e.g., digital cameras), biosensors (e.g., photometric biosensors, electrochemical biosensors), an eye-tracking system (which may include digital camera(s), directable infrared lightings/lasers, accelerometers, or the like), capacitance sensors, radio antennas, galvanic skin sensors, GSR sensors, EEG devices, capacitance probes, or the like. System 1000 can be used, in some embodiments, to implements computing system 208. In some embodiments, system 1000 can include applications (e.g. a vital signs camera application) for measuring various user attributes such as breathing rate, pulse rate and/or blood oxygen saturation from digital image data. It is noted that digital images of the user (e.g. obtained from a user-facing camera in the eye-tracking system) and/or other people in the range of an outward facing camera can be obtained. In some embodiments, the application can analyze video clips record of a user's fingertip pressed against the lens of a digital camera in system 1000 to determine a breathing rate, pulse rate and/or blood oxygen saturation value.

In some embodiments, the system environment 1000 of FIG. 10 may be modified to operate as a mobile device and/or a wearable computing system (e.g. a smart watch, smart glasses, a smart glove, other optical head-mounted displays, electronic textiles, etc.), in addition to providing voice communications functionality, mobile device 1000 may be arranged to provide mobile packet data communications functionality in accordance with different types of cellular radiotelephone systems. Examples of cellular radiotelephone systems offering mobile packet data communications services may include GSM with GPRS systems (GSM/GPRS), CDMA systems, Enhanced Data Rates for Global Evolution (EDGE) systems, EV-DO systems, Evolution Data and Voice (EV-DV) systems, High Speed Downlink Packet Access (HSDPA) systems, High Speed Uplink Packet Access (HSUPA), 3GPP Long-Term Evolution (LTE), and so forth. Such a mobile device may be arranged to provide voice and/or data communications functionality in accordance with different types wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the institute of Electrical and Electronics Engineers (IEEE) 802.xx series of protocols, such as the IEEE 802.11 a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile device may be arranged to perform data communications in accordance with different types of shorter-range wireless systems, such as a wireless personal area network (PAN) system. One example of a suitable wireless PAN system offering data communication services may include a Bluetooth system operating in accordance with the Bluetooth Special Interest Group series of protocols, including Bluetooth Specifications (e.g. versions v1.0, v1.1, v1.2, v2.0, or v2.0 with Enhanced Data Rate (EDR), etc.), as well as one or more Bluetooth Profiles, and so forth. Other examples may include systems using infrared techniques or near-field communication techniques and protocols, such as electromagnetic induction (EMI) techniques. An example of EMI technique may include passive or active radiofrequency identification (RFID) protocols and devices.

Short Message Service (SMS) messaging is a form of communication supported by most mobile telephone service providers and widely available on various networks including Global System for Mobile Communications (GSM), Code Division Multiple Access (CDMA), Time Division Multiple Access (TDMA), third-generation (3G) networks, and fourth-generation (4G) networks. Versions of SMS messaging are described in GSM specifications such as GSM specification 03.40 "Digital cellular telecommunications system (Phase 2+); Technical realization of the Short Message Service" and GSM specification 03.38 "Digital cellular telecommunications system (Phase 2+); Alphabets and language-specific information."

In general, SMS messages from a sender terminal may be transmitted to a Short Message Service Center (SMSC), which provides a store-and-forward mechanism for delivering the SMS message to one or more recipient terminals. Successful SMS message arrival may be announced by a vibration and/or a visual indication at the recipient terminal. In some cases, the SMS message may typically contain an SMS header including the message source (e.g., telephone number, message center, or email address) and a payload containing the text portion of the message. Generally, the payload of each SMS message is limited by the supporting network infrastructure and communication protocol to no more than 140 bytes which translates to 160 7-bit characters based on a default 128-character set defined in GSM specification 03.38, 140 8-bit characters, or 70 16-bit characters for languages such as Arabic, Chinese, Japanese, Korean, and other double-byte languages.

Additional Use Cases and Process

Figure 11:
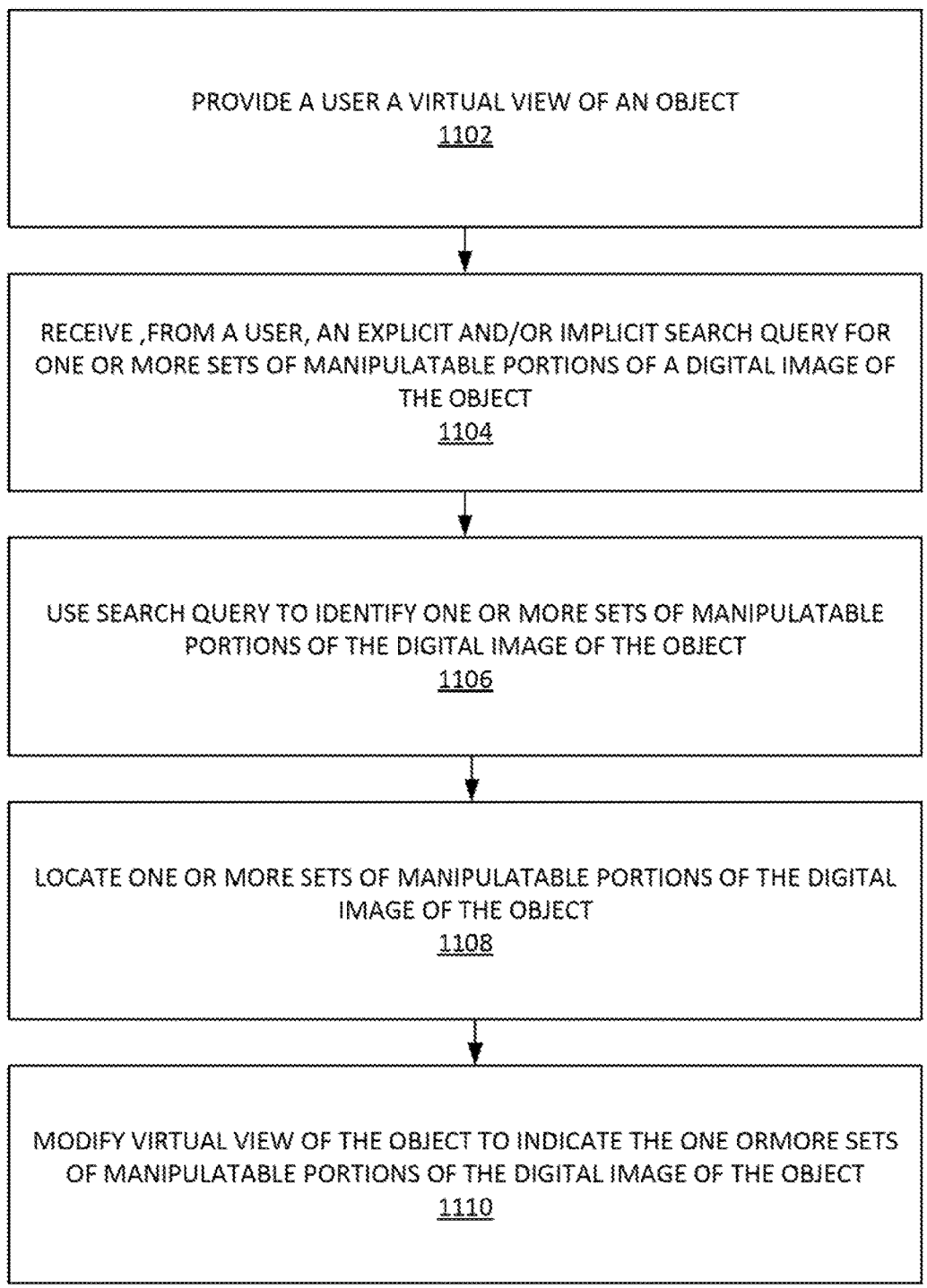
FIG. 11 depicts an example process of obtaining symbolic user input to identify regions of an object that can be manipulated by a user gesture.

FIG. 11 depicts an example process 1100 of obtaining symbolic user input to identify regions of an object that can be manipulated by a user gesture. It is noted that an object can have multiple regions that can be manipulated by a user gesture. These regions can be grouped into various sets based on such factors as subject matter, size, location, relationship to a user state and/or attribute, past user search histories, and the like. A user can access a specified set of manipulable portions of a digital image of an object in various manners. For example, a user can input a voice and/or text description. A search engine can match the user input with one or more set of manipulable portions of a digital image of the object. The user can view a virtual view of a scene that includes the object. The one or more set of manipulable portions of a digital image of the object (and/or other objects in the virtual view) can be visually modified to indicate the availability of the manipulable portions. For example, the user can input the term 'car repair', This term can be used to identify one or more set of manipulable portions of a digital image in the virtual view that are related to 'car repair' (and/or other genres such as 'vehicle', 'transportation', 'mechanics', etc.). In another example, a user can draw a digital image of a symbol related to 'car repair' such as a wrench and the like. The user can obtain a digital image of the drawing of the symbolic object. An image recognition operation can be performed and an interpretation of the symbol obtained (e.g. by matching a result of the image recognition operation with a symbol interpretation in table). In some examples, user behavior can be obtained and interpreted to determine one or more set of manipulable portions of a digital image of the object. For example, user eye tracking fixations can be used to identify objects, words and other items of interest to a user. Searches for one or more set of manipulable portions of a digital image of the object can be performed using this information. Additionally, portions of an object that a user touches or moves the object to view can be identified and used in searches for one or more set of manipulable portions of a digital image of the object can be performed using this information.

In some examples, process 1100 can include step 1102. In step 1102, a user can be provided with a virtual view of an object. For example, the user can be wearing smart glasses that provide a both a physical view of the object (e.g. an automobile, a person, a pet, a building, a book, a toy, etc.) with augmented-reality elements overlaying and/or otherwise visually associated with the object. In step 1104, an explicit and/or implicit search query can be received from the user. An explicit search query can include a text, image, voice and/or other user input. An implicit query can be derived from user behavior (e.g. an eye pause on a term can indicate using that term in an implicit search query, an eye fixation and/or user touch as detected by a digital camera on an object can be used to identify object and use object's identity in an implicit search query, etc.). The search query can be for one or more manipulable portions of a digital image of the object (e.g. as view in a smart phone screen, as viewed by augmented-reality goggles, etc.). In some embodiments, the user can view a real view of the object but still have access to augmented-reality elements overlaying the object such as with some smart glass versions of augmented-reality goggles). In step 1106, the search query can be used to identify one or more manipulable portions of the digital image of the object. The one or more manipulable portions of the digital image of the object can be stored in a database accessible by a search engine accessible by the user's computing device. In step 1108, the one or more manipulable portions of the digital image of the object can be located in the user's view (e.g. a virtual view) of the object. In step 1110, the user's virtual view can be modified to indicate the one or more manipulable portions of the digital image of the object. It is noted that, in some embodiments, a virtual view can include virtualized images that serve as proxies for real-world elements, augmented-reality elements and/or real-world images (e.g. both as seen through a lens upon which virtualized images and/or augmented reality element are projected and/or obtained by a digital camera and provided via a computer display).

It is noted that in some example embodiments, the exterior view of an object can be virtualized. The user can provide digital images of the interior view of a virtualized exterior view. Accordingly, a hybrid physical-virtual view can be provided in some examples. This can be an augmented-reality view. A used herein, a 'user' can include user-side computing devices such as virtual-reality systems and/or mobile device that include outward-facing digital camera(s). The digital camera can be used to obtain interior views of an object, it is noted that in some example embodiments, augmented-reality views can be utilized in lieu of virtual-reality views.

Interior views can be matched with a specified virtualized exterior view. For example, a database of virtualized exterior views of objects can be maintained. Interior views can be image recognized and parsed. The contents of an interior view can then be matched (e.g. with a table) with specified virtualized exterior views.

Figure 12:
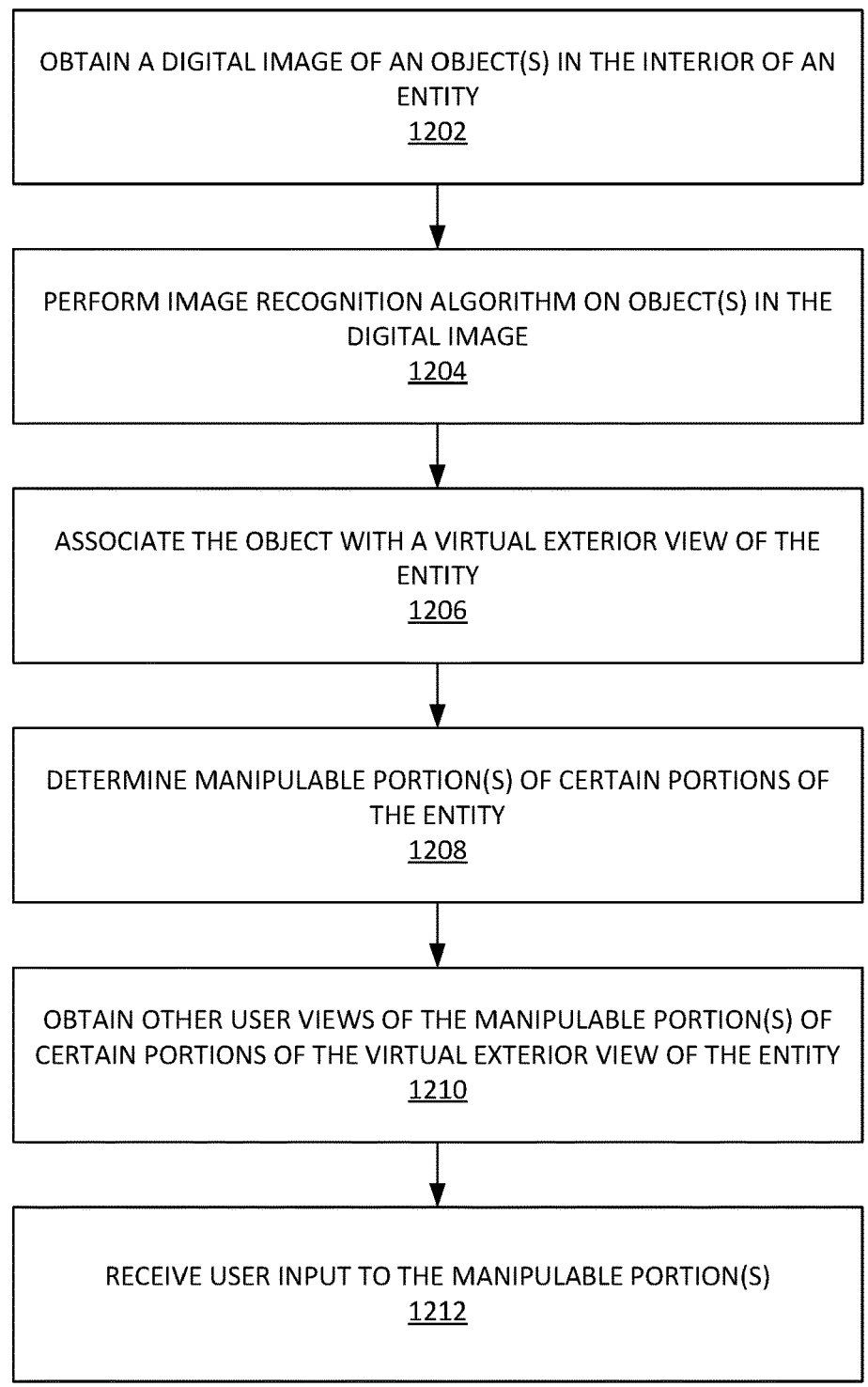
FIG. 12 illustrates an example process for manipulating interior portions and/or exterior portions of a hybrid virtual-real-world image, according to some embodiments.

FIG. 12 illustrates an example process 1200 for manipulating interior portions and/or exterior portions of a hybrid virtual-real-world image, according to some embodiments. In step 1202, process 1200 can obtain a digital image of an object(s) in the interior of an entity. In step 1204, process 1200 can perform image recognition algorithm on object(s) in the digital image. In step 1206, process 1200 can associate the object with a virtual exterior view of the entity. In step 1208, process 1200 can determine manipulable portion(s) of certain portions of the entity. In step 1210, process 1200 can obtain other user views of the manipulable portion(s) of certain portions of the virtual exterior view of the entity. In step 1212, process 1200 can receive user input to the manipulable portion(s). Process 1600 can also include obtaining a user query and matching the user query with at least one manipulable portion of a virtual view of the digital image of the object.

Figure 13:
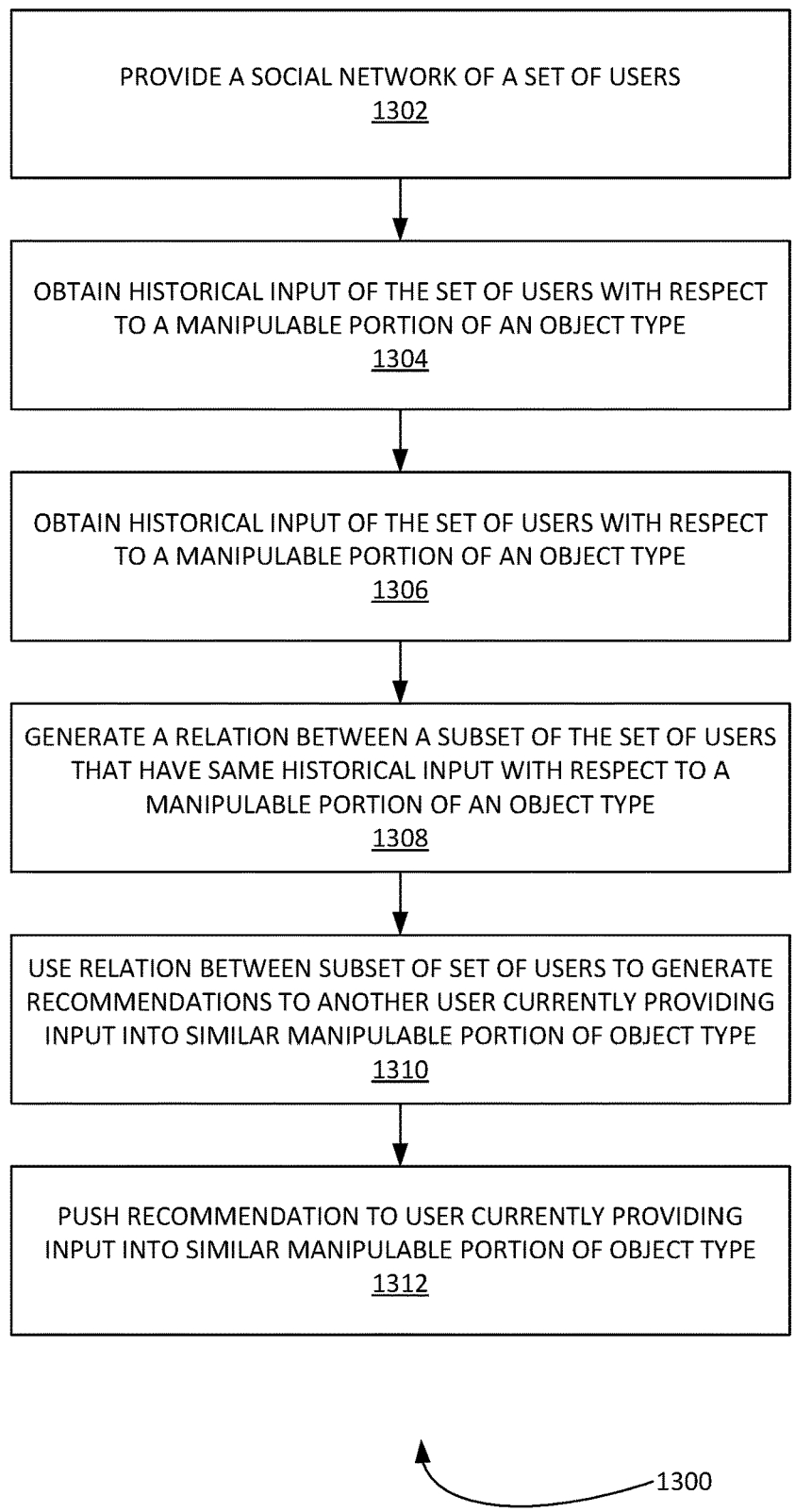
FIG. 13 illustrates an example process for utilizing social networks based on common use of one or more manipulations in a recommendation system, according to some embodiments.

FIG. 13 illustrates an example process 1300 for utilizing social networks based on common use of one or more manipulations in a recommendation system, according to some embodiments. In step 1302, process 1300 can provide a social network of a set of users. As used herein, a social graph in the present context can be a graph that depicts personal relations of users of the augmented and/or virtual-reality systems and processes provided herein. For example, the graph can be representation of a social network. The graph can be used to examine the relational representation in a social network. Social network analysis (SNA) can be used to examine and understand the various social structures through the use of network and graph theories. SNA techniques can be used to characterize networked structures in terms of nodes (individual actors, people, and/or things within the network) and the ties, edges, or links (e.g. relationships or interactions) that connect them. An example relationship can be use of a common manipulable portion on a similar object type by two users. These users can then be connected in the graph. In this way, a social network can be mapped in a social graph. SNA can use common use of manipulable portions to measure such aspects of the social network as, inter alia: homophily, multiplexity, mutuality/reciprocity, network closure, propinquity, etc. It is noted that various other user attributes can be utilized as well (e.g. user demographics, location, profile information, object type associated with the manipulable portion, etc.). Social networking density and segmentation attributes can also be analyzed.

In step 1304, process 1300 can obtain historical input of the set of users with respect to a manipulable portion of an object type. In step 1306, process 1300 can obtain historical input of the set of users with respect to a manipulable portion of an object type. In step 1308, process 1300 can generate a relation between a subset of the set of users that have same historical input with respect to a manipulable portion of an object type. In step 1310, process 1300 can use relation between subset of set of users to generate recommendations to another user currently providing input into similar manipulable portion of object type.

In step 1312, process 1300 can push recommendations to user currently providing input into similar manipulable portion of object type. A recommendation system can be an information filtering system that seek to predict the "rating" or "preference" that a user would give to an item. For example, process 1300 can score various possible recommendations, sort said recommendations based on the score and then push the specified number of top recommendations to a user.

Figure 14:
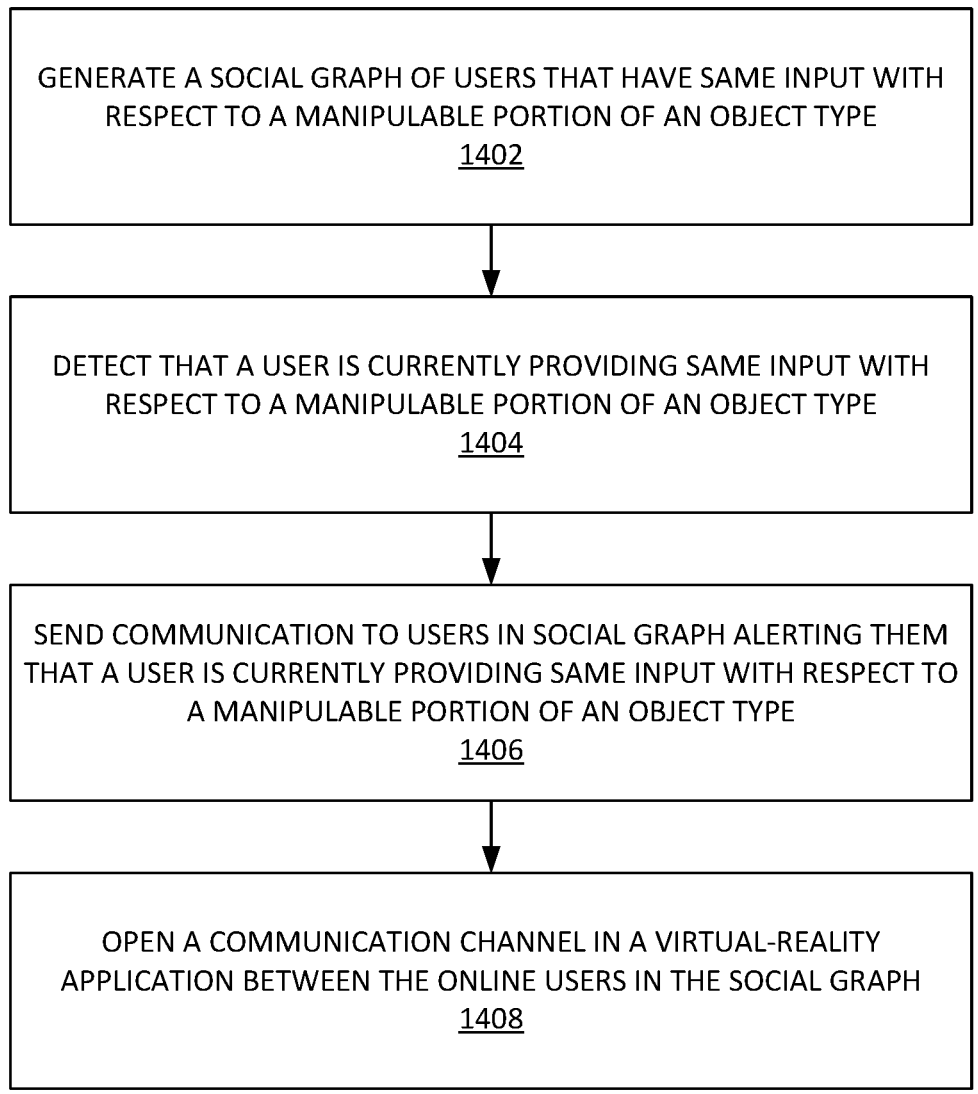
FIG. 14 illustrates an example process for enabling communication between related users in a social graph generated by common use of manipulable portions, according to some embodiments.

FIG. 14 illustrates an example process 1400 for enabling communication between related users in a social graph generated by common use of manipulable portions, according to some embodiments. In step 1402, process 1400 can generate a social graph of users that have same input with respect to a manipulable portion of an object type. It is noted that various other user attributes can be utilized as well (e.g. user demographics, location, profile information, object type associated with the manipulable portion, etc.).

In step 1404, process 1400 can detect that a user is currently providing same input with respect to a manipulable portion of an object type. In step 1406, process 1400 can send communication to users in social graph alerting them that a user is currently providing same input with respect to a manipulable portion of an object type. For example, the other users in the social graph can be connected to the user based on a relation showing that all the users are connected based on a past and/or current manipulation of a manipulable portion. In step 1408 process 1400 can open a communication channel in a virtual-reality application between the online users in the social graph. The communication channel can be a text message channel, an email, an instant messaging channel, a push notification, a voice message, etc. Process 1600 can also include obtaining a user query and matching the user query with at least one manipulable portion of a virtual view of the digital image of the object.

Figure 15:
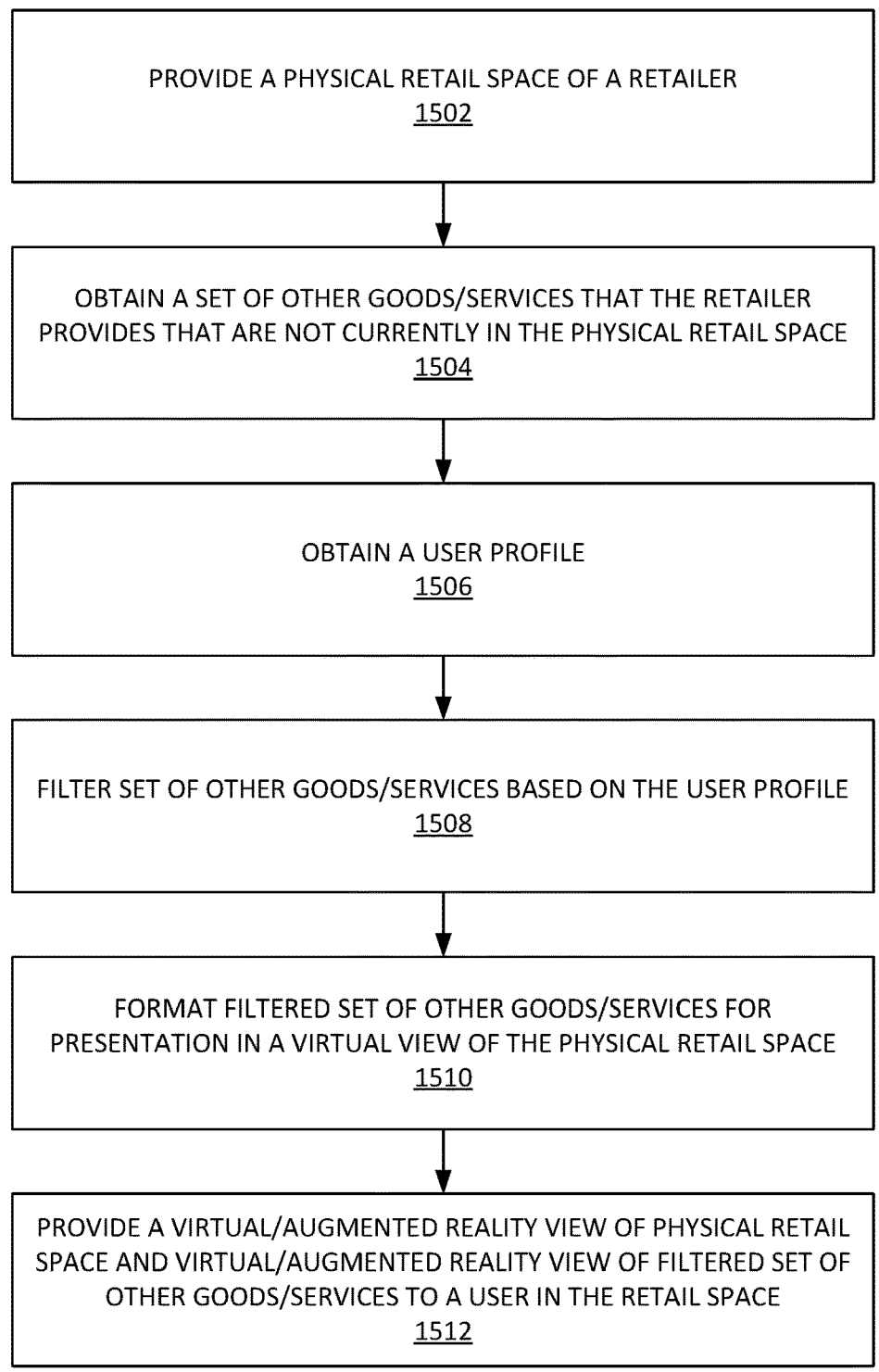
FIG. 15 illustrates an example process for generating a hybrid virtual reality and physical retail space, according to some embodiments.

FIG. 15 illustrates an example process 1500 for generating a hybrid virtual reality and/or physical retail space, according to some embodiments. In step 1502, process 1500 can provide a physical retail space of a retailer. In step 1504, process 1500 can obtain a set of other goods/services that the retailer provides that are not currently in the physical retail space. In step 1506, process 1500 can obtain a user profile and/or a user query. In step 1508, process 1500 can filter set of other goods/services based on the user profile and/or the user query. In step 1510, process 1500 can format filtered set of other goods/services for presentation in a virtual view of the physical retail space. In step 1512, process 1500 can provide a virtual/augmented reality view of physical retail space and virtual/augmented reality view of filtered set of other goods/services to a user in the retail space.

In one example, a store owner set up a virtual space with physical world limitations. While the virtual interior view may be contained on a website, the virtual interior view can also be provided that represents the physical store and the happenings in that physical store. Any data/results can be returned to the store owner's website and/or mobile applications. Accordingly, this can be used to generate a recursive loop of information that describes various interactions within or about the store.

Figure 16:
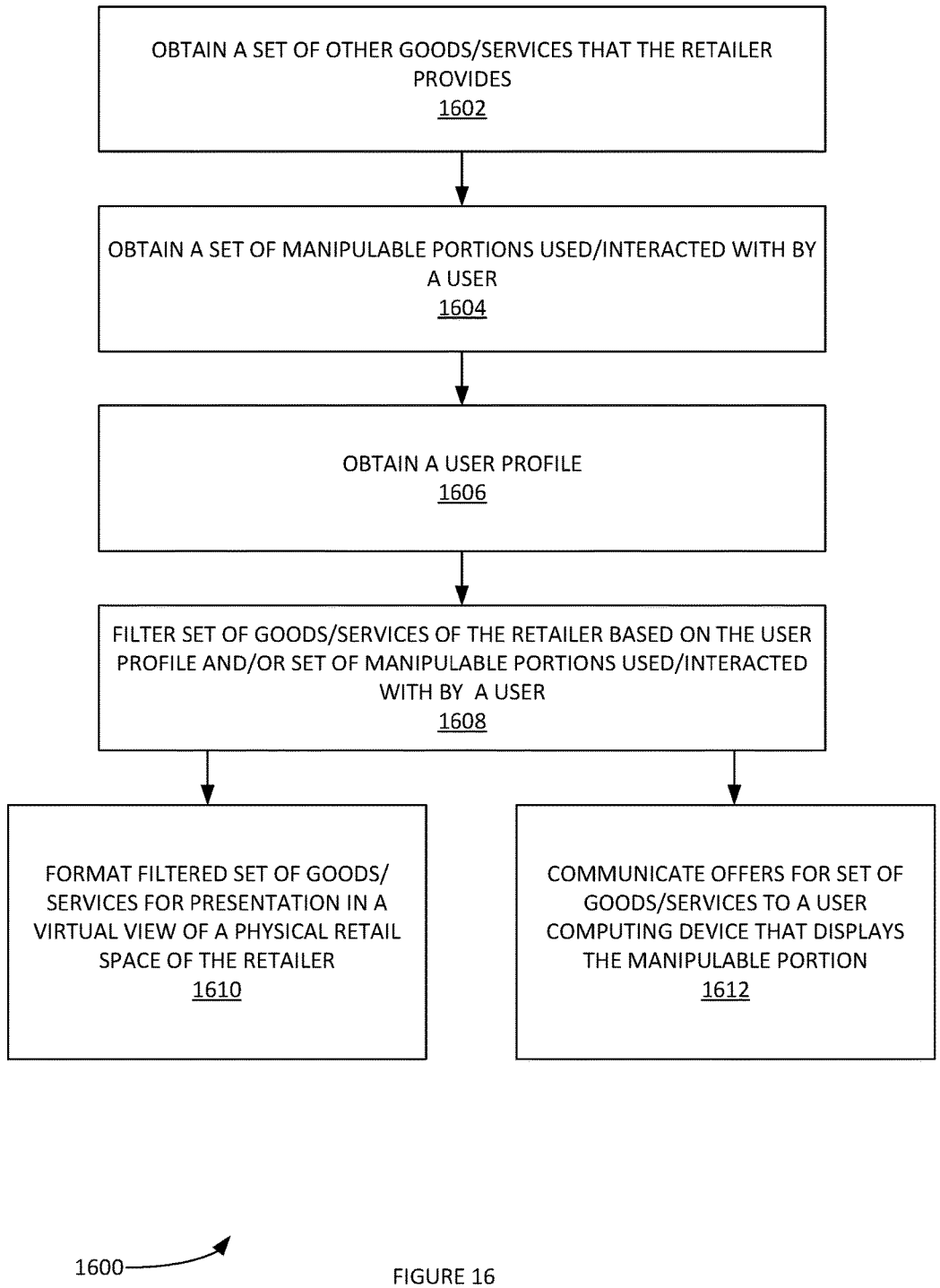
FIG. 16 illustrates an example process presenting a set of retailer's goods and/or services to a user, according to some embodiments.

FIG. 16 illustrates an example process 1600 presenting a set of retailer's goods and/or services to a user, according to some embodiments. In step 1602, process 1600 can obtain a set of other goods/services that the retailer provides. In step 1604, process 1600 can obtain a set of manipulable portions used/interacted with by a user. In step 1606, process 1600 can obtain a user profile. In step 1608, process 1600 can filter set of goods/services of the retailer based on the user profile and/or set of manipulable portions used/interacted with by a user. In step 1610, process 1600 can format filtered set of goods/services for presentation in a virtual view of a physical retail space of the retailer. In step 1612, process 1600 can communicate offers for set of goods/services to a user computing device that displays the manipulable portion. Process 1600 can also include obtaining a user query and matching the user query with at least one manipulable portion of a virtual view of the digital image of the object.

In one example, a virtual personal assistant (VPA) can return various dimensions, attributes and/or qualities. The results can be displayed (e.g. in a virtual reality and/or augmented reality display, etc.) and returned based on queries provided by a user. This can be implemented without the user having to be fully immersed in a virtual-reality environment, VPA can map a virtual augmented reality onto a real world object. The user may only 'see' the real world object. The user manipulations of the real world object can be guided/prompted by the VPA while the actual user is not actually immersed in the augmented/virtual reality environment and/or at least not in the augmented/virtual reality environment of the object. Annotations to guide the user or audio prompts or cues can also be provided. A user can return to augmented/virtual reality environment to re-map the environment if the VPA becomes lost or misdirected. VPA can return results to website/application side users as well. A VPA can be a software agent that can perform tasks or services for an individual. These tasks or services are based on user input, location awareness, and the ability to access information from a variety of online sources (such as weather or traffic conditions, news, stock prices, user schedules, retail prices, etc.).

It is noted that various machine learning, ranking and/or various optimizations can be utilized by the systems and processes provided herein. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Conclusion

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) or some specialized application-specific language.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method comprising:
   obtaining a digital image of an object with a digital camera;
   identifying the object;
   receiving a user query;
   matching the user query with at least one manipulatable portion of a virtual view of the digital image of the object;
   obtaining the at least one manipulatable portion from a database of manipulatable portions of the object;
   integrating the at least one manipulatable portion with the virtual view of the digital image of the object, wherein a manipulatable portion comprises a region of an augmented-reality element integrated into the virtual view of the digital image of the object, and wherein the augmented-reality element comprises a hyperlink to another augmented-reality element comprising a virtual interior view of the object, wherein a user accesses the other augmented-reality element by performing a predefined user hand gesture with respect to a location of the object as a region wherein the object is represented with a computerized-user interface that corresponds to the at least one manipulatable portion; and
   displaying, with a computer display, the at least one manipulable portion in the virtual view of the digital image of the object and the augmented-reality element.

2. The method of claim 1, wherein the computer display comprises an augmented reality goggles display system.

3. The method of claim 1 further comprising:
   providing a physical retail space of a retailer; and
   obtaining a list of a set of other goods that the retailer provides that are not currently in the physical retail space.

4. The method of claim 3 further comprising:
   obtaining a user profile; and
   filtering the list of the set of other goods based on the user profile.

5. The method of claim 4 further comprising:
   formatting the filtered set of other goods for presentation in a virtual view of the physical retail space.

6. The method of claim 5 further comprising:
   providing an augmented reality view of physical retail space and a virtual reality view of the filtered set of other goods/services to a user in the retail space.

7. The method of claim 1 further comprising:
   providing a social network of a set of users; and
   obtaining a historical input of the set of users with respect to a manipulable portion of an object type.

8. The method of claim 7 further comprising:
   obtaining the historical input of the set of users with respect to a manipulable portion of the object type.

9. The method of claim 8 further comprising:
   generating a relation between a subset of the set of users that have a same historical input with respect to a manipulable portion of an object type; and
   using relation between subset of set of users to generate a recommendation to another user currently providing input into a similar manipulable portion of object type.

10. The method of claim 9 further comprising:
    pushing recommendation to user's augmented-reality display, wherein the user is currently providing input into the similar manipulable portion of the object type.

11. The method of claim 1 further comprising:
    generating a social graph of users that have the same input with respect to the manipulable portion of an object type.

12. The method of claim 11 further comprising:
    detecting that the user is currently providing same input with respect to a manipulable portion of an object type.

13. The method of claim 12 further comprising:
    sending a communication to users in the social graph alerting them that the user is currently providing same the input with respect to the manipulable portion of the object type.

14. The method of claim 13 further comprising:
    opening a communication channel in an augmented-reality application between the online users in the social graph.

15. A computerized system comprising:
    a processor configured to execute instructions;
    a memory containing instructions when executed on the processor, causes the processor to perform operations that:
      obtain a digital image of an object with a digital camera;
      identify the object;
      receive a user query;
      matching the user query with at least one manipulatable portion of a virtual view of the digital image of the object;
      obtaining the at least one manipulatable portion from a database of manipulatable portions of the object;
      integrating the at least one manipulatable portion with the virtual view of the digital image of the object, wherein a manipulatable portion comprises a region of an augmented-reality element integrated into the virtual view of the digital image of the object, and wherein the augmented-reality element comprises a hyperlink to another augmented-reality element comprising a virtual interior view of the object, wherein a user accesses the other augmented-reality element by performing a predefined user hand gesture with respect to a location of the object as a region wherein the object is represented with a computerized-user interface that corresponds to the at least one manipulatable portion;
      determine that the user has performed the predefined user gesture with respect to a location of the object that corresponds to the augmented-reality element; and
      display, with a computer display, the at least one manipulable portion in the virtual view of the digital image of the object and the augmented-reality element.

16. A method of an augmented-reality simulation:
    providing, with at least one processor, an augmented-reality view with a display of a computing device, wherein the augmented-reality comprises a physical object and at least one augmented-reality element;
    obtaining a digital image of a symbolic input drawn by a user;
    obtaining at least one digital image of a first user hand gesture with respect to the symbolic input drawn by the user;
    providing a one or more set of manipulable portions of the augmented reality element;
    determining which of the one or more set of manipulable portions are relevant to the symbolic input and the first user hand gesture;

automatically identifying the physical object with an image recognition system;

receiving a user query via a user input system of the computer device;

matching, with at least one processor, the user query with at least one manipulable portion of the augmented-reality view;

obtaining the at least one manipulable portion from a database of manipulable portions associated with the physical object;

integrating the at least one manipulable portion with the augmented-reality view, wherein a manipulable portion comprises a region of the augmented-reality element integrated into the augmented-reality view, and wherein the augmented-reality element comprises a hyper link to another augmented-reality element comprising a virtual interior view of the physical object;

determining that the user performed a predefined user gesture with respect to a location of the physical object that corresponds to the at least one manipulable portion; and displaying, with a computer display, the at least one manipulable portion in the augmented-reality view.

\* \* \* \* \*